US009813576B2

(12) United States Patent
Niimura

(10) Patent No.: US 9,813,576 B2
(45) Date of Patent: Nov. 7, 2017

(54) COMMUNICATION APPARATUS, CONTROL METHOD, AND PROGRAM

(71) Applicant: CANON KABUSHIKI KAISHA, Tokyo (JP)

(72) Inventor: Hiroyuki Niimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/153,556

(22) Filed: May 12, 2016

(65) Prior Publication Data

US 2016/0352949 A1   Dec. 1, 2016

(30) Foreign Application Priority Data

May 29, 2015  (JP) ................................ 2015-110370

(51) Int. Cl.
*G06K 15/00* (2006.01)
*H04N 1/00* (2006.01)
*G06F 12/00* (2006.01)
*G06F 3/12* (2006.01)

(52) U.S. Cl.
CPC ......... *H04N 1/00896* (2013.01); *G06F 12/00* (2013.01); *H04N 2201/0094* (2013.01)

(58) Field of Classification Search
None
See application file for complete search history.

(56) References Cited

U.S. PATENT DOCUMENTS

| 9,396,788 | B1* | 7/2016 | Nakaminato | ..... G11C 11/40615 |
| 2012/0254469 | A1* | 10/2012 | Ando | ...................... H04L 69/28 |
| | | | | 709/248 |
| 2012/0266004 | A1* | 10/2012 | Saito | ..................... G06F 1/3284 |
| | | | | 713/324 |

FOREIGN PATENT DOCUMENTS

JP    H07-134628 A    5/1995

* cited by examiner

*Primary Examiner* — Dov Popovici
(74) *Attorney, Agent, or Firm* — Canon U.S.A., Inc. IP Division

(57) ABSTRACT

A communication apparatus includes a connection unit, a storage unit, first and second processing units, and a control unit. The storage unit operates in one of a first state where a memory keeping process to keep information stored in the storage unit is executed in response to accepting an outside instruction, and a second state in which the memory keeping process is executed without accepting an outside instruction. The first processing unit performs a first process based on network received information and the stored information. The second processing unit performs a second process different from the first process and based on the stored information. The control unit forces the storage unit to transit from the first to the second state where the first and second processing units are not accessing the storage unit. Consumption power consumed in the first state is larger than consumption power consumed in the second state.

19 Claims, 14 Drawing Sheets

FIG. 4

| | OFF MODE 301 | NORMAL POWER MODE 302 | POWER SAVING MODE 304 | POWER SAVING MODE 305 | POWER SAVING MODE 306 | POWER SAVING MODE 307 | POWER SAVING MODE 308 | POWER SAVING MODE 309 |
|---|---|---|---|---|---|---|---|---|
| CPU 202 | SLEEP | OPERATE | OPERATE | OPERATE | SLEEP | SLEEP | SLEEP | OPERATE |
| CPU 210 | OFF | OPERATE | OPERATE | SLEEP | OPERATE | SLEEP | OFF | OFF |
| CPU 214 | OFF | OPERATE | SLEEP | SLEEP | SLEEP | SLEEP | SLEEP | SLEEP |
| NETWORK CONTROL UNIT 211 | OFF | OPERATE | OPERATE | OPERATE | OPERATE | OPERATE | OFF | OFF |
| DISPLAY UNIT 215 | OFF | OPERATE | OFF | OFF | OFF | OFF | OFF | OFF |
| CLOCK (OVER WHOLE APPARATUS) | LOWEST | NORMAL | LOW #2 | LOW #2 | LOW #2 | LOW #2 | LOW #1 | LOW #2 |
| DRAM 208 | SELF REFRESH | NORMAL REFRESH | NORMAL REFRESH | NORMAL REFRESH | NORMAL REFRESH | SELF REFRESH | SELF REFRESH | NORMAL REFRESH |
| DRAM PHY 207 | OFF | ON | ON | ON | ON | ON | OFF | ON |

FIG. 5

| TRANSITION CONDITION | POWER STATE (BEFORE TRANSITION) | POWER STATE (AFTER TRANSITION) | CONDITION | DETAILS |
|---|---|---|---|---|
| 310 | OFF MODE 301 | NORMAL POWER MODE 302 | PRESSING-DOWN OF POWER KEY | SOFT POWER-ON PROCESS |
| 311 | NORMAL POWER MODE 302 | OFF MODE 301 | PRESSING-DOWN OF POWER KEY | SOFT POWER-OFF PROCESS |
| 312 | NORMAL POWER MODE 302 | POWER SAVING MODE 304 | NETWORK IS ENABLED, AND NO INTERRUPT REQUEST FOR PROCESS IN NORMAL POWER MODE 302 HAS BEEN ISSUED TO ANY CPU WITHIN PARTICULAR PERIOD OF TIME | TRANSITION TO POWER SAVING MODE 304 |
| 313 | POWER SAVING MODE 304 | NORMAL POWER MODE 302 | INTERRUPT REQUEST FOR PROCESS IN NORMAL POWER MODE 302 OCCURS TO ONE OF CPUS | RETURN TO NORMAL POWER MODE 302 |
| 314 | POWER SAVING MODE 304 | POWER SAVING MODE 305 | CPU 210 HAS BEEN IN IDLE STATE FOR PARTICULAR PERIOD OF TIME | TRANSITION TO POWER SAVING MODE 305 |
| 315 | POWER SAVING MODE 305 | POWER SAVING MODE 304 | INTERRUPT REQUEST TO CPU 210 OCCURS OR INTERRUPT REQUEST TO ONE OF CPU'S FOR PROCESS IN NORMAL POWER MODE 302 OCCURS | RETURN TO NORMAL POWER MODE 304 |
| 316 | POWER SAVING MODE 304 | POWER SAVING MODE 306 | CPU 202 HAS BEEN IN IDLE STATE OVER PARTICULAR PERIOD OF TIME | TRANSITION TO POWER SAVING MODE 306 |
| 317 | POWER SAVING MODE 306 | POWER SAVING MODE 304 | INTERRUPT REQUEST TO CPU 202 OCCURS OR INTERRUPT REQUEST TO ONE OF CPU'S FOR PROCESS IN NORMAL POWER MODE 302 OCCURS | RETURN TO NORMAL POWER MODE 304 |
| 318 | POWER SAVING MODE 305 | POWER SAVING MODE 307 | NO ACCESS TO DRAM 208 OCCURS | TRANSITION TO POWER SAVING MODE 307 |
| 319 | POWER SAVING MODE 307 | POWER SAVING MODE 305 | INTERRUPT REQUEST TO CPU 202 OCCURS OR INTERRUPT REQUEST TO ONE OF CPU'S FOR PROCESS IN NORMAL POWER MODE 302 OCCURS | RETURN TO NORMAL POWER MODE 305 |
| 320 | POWER SAVING MODE 306 | POWER SAVING MODE 307 | NO ACCESS TO DRAM 208 OCCURS | TRANSITION TO POWER SAVING MODE 307 |
| 321 | POWER SAVING MODE 307 | POWER SAVING MODE 306 | INTERRUPT REQUEST TO CPU 210 OCCURS OR INTERRUPT REQUEST TO ONE OF CPU'S FOR PROCESS IN NORMAL POWER MODE 302 OCCURS | RETURN TO NORMAL POWER MODE 305 |
| 322 | NORMAL POWER MODE 302 | POWER SAVING MODE 308 | NETWORK IS DISABLED, AND NO INTERRUPT REQUEST FOR PROCESS IN NORMAL POWER MODE 302 HAS BEEN ISSUED TO ANY CPU WITHIN PARTICULAR PERIOD OF TIME | TRANSITION TO POWER SAVING MODE 308 |
| 323 | POWER SAVING MODE 308 | NORMAL POWER MODE 302 | INTERRUPT REQUEST OTHER THAN INTERRUPT REQUEST DUE TO DATA RECEPTION OCCURS TO ONE OF CPUS | RETURN TO NORMAL POWER MODE 302 |
| 324 | POWER SAVING MODE 308 | POWER SAVING MODE 309 | INTERRUPT REQUEST OCCURS DUE TO DATA RECEPTION | TRANSITION TO POWER SAVING MODE 309 |
| 325 | POWER SAVING MODE 309 | POWER SAVING MODE 308 | NO INTERRUPT REQUEST FOR PROCESS IN NORMAL POWER MODE 302 HAS BEEN ISSUED TO ANY CPU WITHIN PARTICULAR PERIOD OF TIME | TRANSITION TO POWER SAVING MODE 308 |
| 326 | POWER SAVING MODE 309 | NORMAL POWER MODE 302 | INTERRUPT REQUEST FOR PROCESS IN NORMAL POWER MODE 302 OCCURS TO ONE OF CPUS | RETURN TO NORMAL POWER MODE 302 |

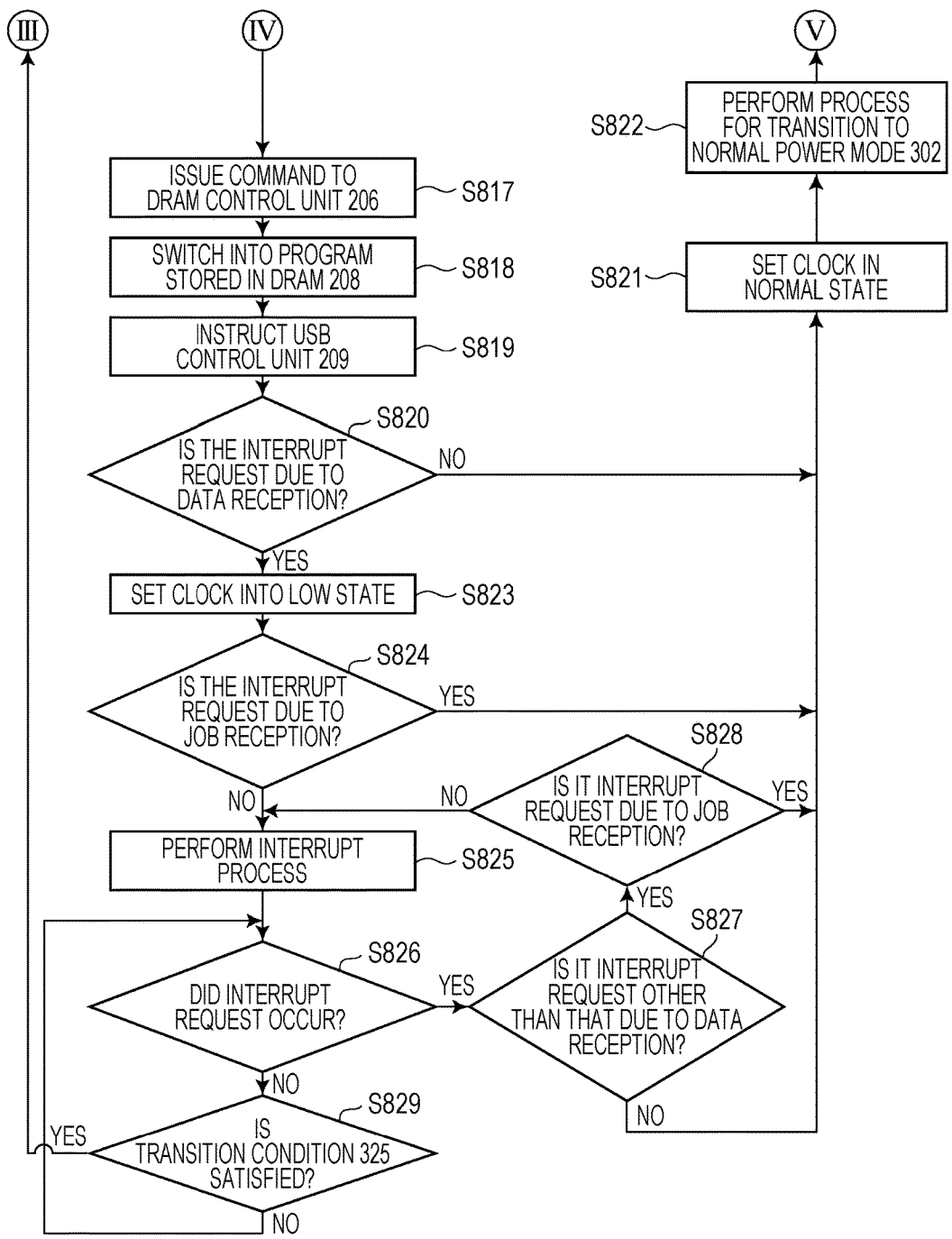

COMMUNICATION APPARATUS, CONTROL METHOD, AND PROGRAM

BACKGROUND OF THE INVENTION

Field of the Invention

The present disclosure relates to a communication apparatus, a control method, and a program.

Description of the Related Art

In recent years, it has been known to use a communication apparatus to communicate with an external apparatus such as a personal computer, a digital camera, a tablet, a smartphone, or the like, via a wired or wireless network. A CPU (central processing unit) in a communication apparatus connected to a network performs a network control process such as a process associated with packets on the network, etc. To increase the processing speed of the CPU, the communication apparatus stores a program, used in an operation performed by the CPU, in a volatile memory capable of being accessed at a high speed. A typical volatile memory is a DRAM (dynamic random-access memory). To retain stored data, the DRAM needs to perform a refresh process. Note that the DRAM is capable of going to a self-refresh state in which a refresh process is performed by the DRAM itself without being accessed from the outside thereby achieving a reduction in consumption power.

However, when the DRAM is in the middle of a self-refresh operation, the CPU is not allowed to use the program stored in the DRAM. Therefore when the DRAM is in the self-refresh operation, the CPU cannot execute the network control even in a state in which the communication apparatus is connected to a network.

In view of the above, Japanese Patent Laid-Open No. 7-134628 discloses a technique in which when the communication apparatus connected to a network is in a first power saving state, limitation is imposed the communication apparatus in terms of transition into a second power saving state in which the DRAM is in the self-refresh state.

However even in a situation in which the apparatus is connected to a network or in a situation in which network connection is set to be enabled and thus there is a possibility that the apparatus is connected to a network, there may be a case in which it is allowed to put the DRAM into the self-refresh state to reduce the power consumption. When the DRAM is not being accessed, for example, in a situation where the network control is not performed although the communication apparatus is connected to a network or the network connection is enabled, it is allowed to put the DRAM in the self-refresh state. However, in the technique disclosed in Japanese Patent Laid-Open No. 7-134628, in the controlling the DRAM not to put it into the self-refresh state, no consideration is given as to whether the DRAM is being accessed or not. Therefore, in the technique disclosed in Japanese Patent Laid-Open No. 7-134628, the transition to the self-refresh state is suppressed even when the DRAM is in a state in which it is allowed to put the DRAM into the self-refresh state.

SUMMARY OF THE INVENTION

The present disclosure provides a communication apparatus capable of performing a process of changing a state of a storage unit even in a situation in which network connection is set to be enabled or a connection to a network is established.

In an aspect of the present disclosure, a communication apparatus includes a connection unit configured to connect to a network, a storage unit configured to operate in one of states including a first state in which a memory keeping process to keep information stored in the storage unit is executed in response to accepting an instruction from the outside, and a second state in which the memory keeping process is executed without accepting an instruction from the outside, a first processing unit configured to perform a first process based on information received via the network and the information stored in the storage unit by accessing the storage unit, a second processing unit configured to perform a second process different from the first process performed by the first processing unit and based on the information stored in the storage unit by accessing the storage unit, and a transition control unit configured to force the storage unit to transit from the first state to the second state in a case where the connection unit is connected to a network and the first processing unit and the second processing unit are not accessing the storage unit, wherein consumption power consumed by the communication apparatus when the storage unit is in the first state is larger than consumption power consumed by the communication apparatus when the storage unit is in the second state.

Further features of the present invention will become apparent from the following description of exemplary embodiments with reference to the attached drawings.

BRIEF DESCRIPTION OF THE DRAWINGS

FIG. 4 is a diagram illustrating states of respective parts of MFP in respective modes.

FIG. 5 is a diagram illustrating conditions for transition to respective modes.

FIGS. 8A and 8B are flow charts illustrating a process performed by a main CPU of a communication apparatus in a situation in which network connection is set to be disabled according to an embodiment.

DESCRIPTION OF THE EMBODIMENTS

The present disclosure is described in further detail below with reference to embodiments in conjunction with drawings. Note that variations and improvements are possible to the embodiments described below without departing from the spirit and the scope of the disclosure as will be apparatus to those skilled in the art. Note that such modified or improved embodiments also fall within the scope of the disclosure.

First Embodiment

First, a communication apparatus according to a first embodiment is described. In the present embodiment, it is assumed by way of example but not limitation that the communication apparatus is a printer. Note that the present embodiment may be applied to other many types of apparatuses as long as the apparatuses are allowed to be connected to a network. For example, the printer may be of one of many types including an ink-jet printer, a full-color laser beam printer, a monochrome printer, etc. In addition to printers, the embodiment may also be applied, for example, a copy machine, a facsimile machine, a portable terminal, a smartphone, a personal computer (PC), a tablet terminal, a PDA (Personal Digital Assistant), a digital camera, etc. The embodiment is also applicable to a multifunction peripheral having a copying function, a facsimile function, a printing function, and/or the like.

Figure 1:
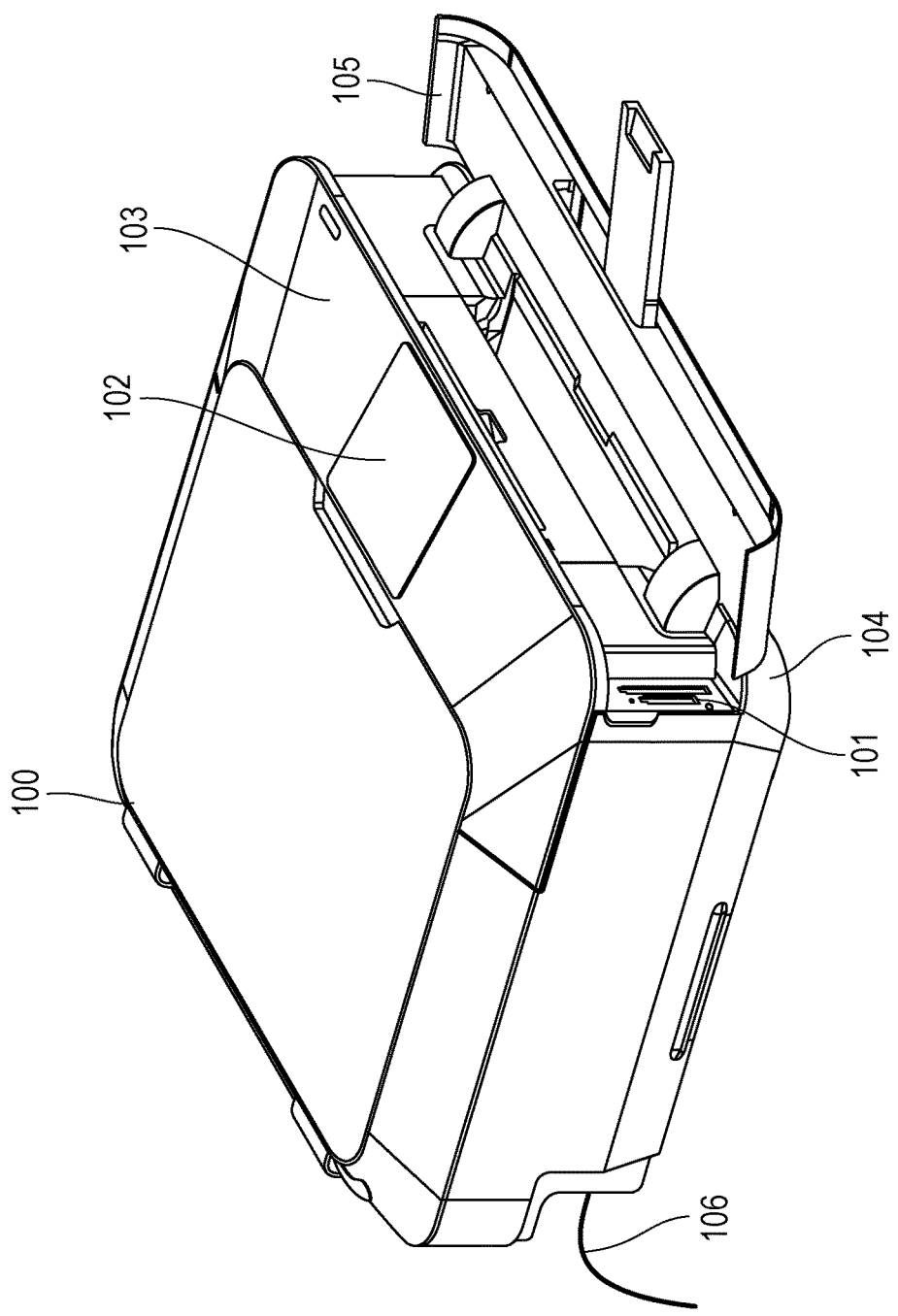
FIG. 1 is a perspective view illustrating an example of a communication apparatus according to an embodiment.

FIG. 1 is a perspective view illustrating an example of a communication apparatus according to the present embodiment. A MFP 100 is a communication apparatus according to the present embodiment.

A card reader unit 101 is a unit for reading a memory card such as an SD card, a compact flash (registered trademark) memory, etc.

A display unit 102 may include a light emitting diode (LED), a liquid crystal display (LCD), and the like. Note that the display unit 102 may not include an LCD. The display unit 102 is capable of displaying, for example, a preview of image data stored in a memory card, guide information on how to handle an error in an operation of the MFP 100, and the like.

An operation unit 103 has keys including a numeric key, a mode setting key, a decision key, a cancel key, a power key, and the like. When a key on the operation unit 103 is operated by a user, the MFP 100 may perform setting in terms of functions or starting conditions of the MFP 100 depending on the operation performed by the user. Note that the display unit 102 and the operation unit 103 may be integrated in a single unit such that displaying information and accepting an operation may be performed using the resultant single unit.

A sheet tray 104 is a unit on which a stack of recording media, on which an image is to be formed, is put. Note that the recording medium is a medium on which an image is formed by the MFP 100. Examples of recording media include paper, a transparency sheet, a label, etc. In the present embodiment, by way of example, printing paper is used as the recording medium.

A paper output tray 105 is a unit on which recording media subjected to the image formation are put.

A USB connection unit 106 controls connection of a USB interface according to a protocol based on the USB connection standard.

The MFP 100 is capable of receiving a job such as a print job, a scan job, or the like by communicating with an external apparatus such as a PC, a tablet terminal, a digital camera, or the like via the USB connection unit 106, and is capable of performing a process associated with the received job.

Figure 2:
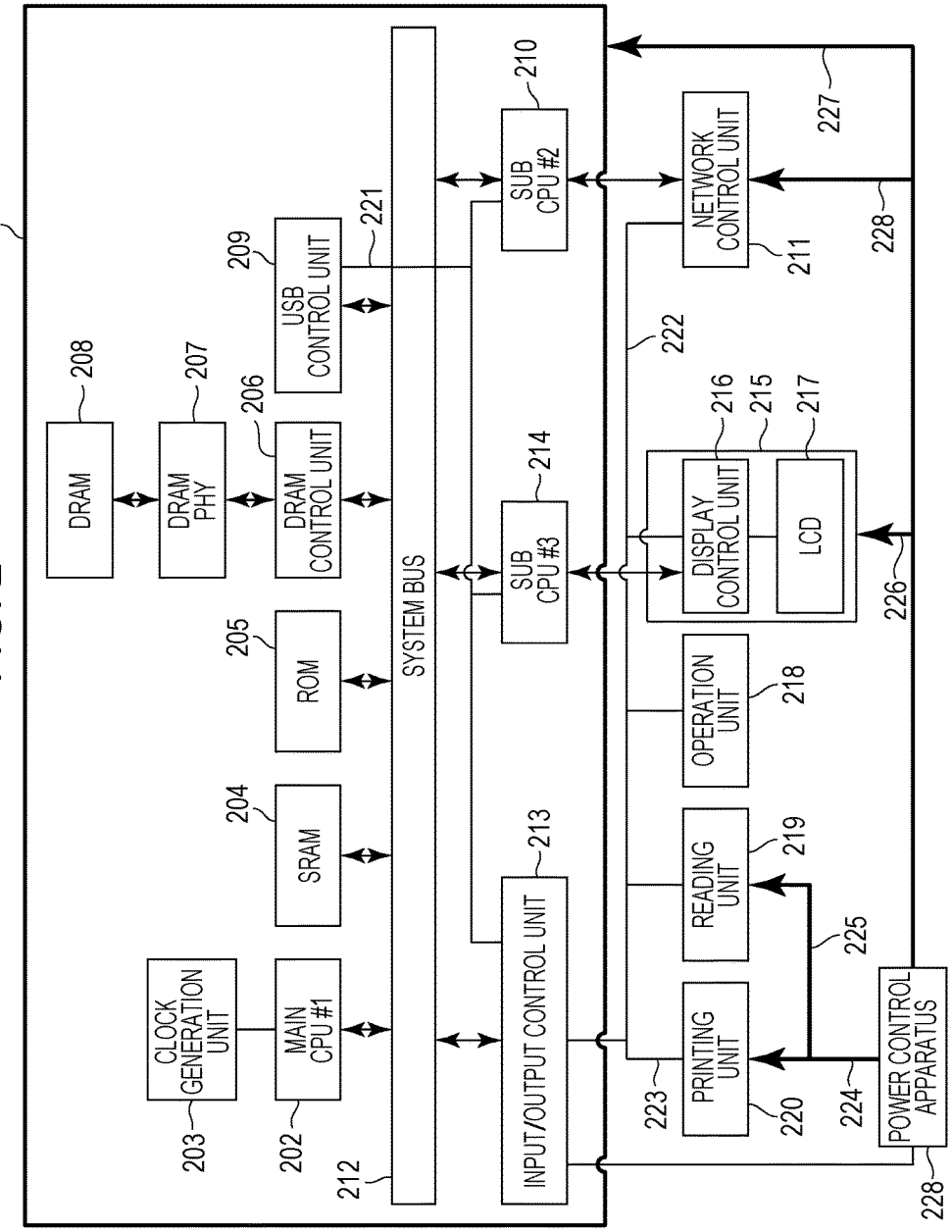
FIG. 2 is a block diagram schematically illustrating a configuration of a communication apparatus according to an embodiment.

FIG. 2 is a block diagram schematically illustrating a configuration of the MFP 100. In the MFP 100, a data processing unit 201 functions as a system control unit that controls the whole MFP 100. In the present embodiment, the MFP 100 includes three CPUs, that is, a CPU 202 functioning as a main CPU, and a CPU 210 and a CPU 214 both functioning as sub CPUs. The CPU 202 controls the whole data processing unit 201. More specifically, for example, the CPU 202 performs a process on a job received from an external apparatus, a process in response to a key input operation performed on the operation unit 103, a process of transmitting information as to the status of the MFP 100, a process of transmitting information as to whether a memory card is inserted in the MFP 100, etc. Examples of processes performed in response to a key input operation on the operation unit 103 include a process of setting the MFP 100, a process of displaying information on the display unit 102, etc. An additional example is a process performed by the CPU 202 to control power supplied to various parts of the MFP 100 by accessing a power control apparatus 228 (described later) via an input/output control unit 213 (described later). The CPU 210 performs the network control by controlling a network control unit 211 described later. The network control includes, for example, processing packet data on a network, receiving job data or the like from an external apparatus connected via the network, etc. The CPU 214 controls a display unit 215 described later in terms of a screen displayed on the display unit 215. The CPU 202, and the CPU 210, and the CPU 214 access an SRAM 204 or a DRAM 208 and execute processes according to programs stored in the SRAM 204 or the DRAM 208. The CPU 202, the CPU 210, and the CPU 214 are capable of switching the program used.

A clock generation unit 203 supplies a clock to the whole MFP 100. The frequency of the clock generated by the clock generation unit 203 is controlled by the CPU 202. The SRAM (Static Random Access Memory) 204 is a storage unit that does not need refreshing (to keep information stored therein), and is used to store a program control variable and/or the like. The SRAM 204 has a memory area for storing setting information of the MFP 100, management data of the MFP 100, etc. The ROM 205 stores fixed data such as a control program executed by the CPU 202, a data table, a built-in operating system (hereinafter referred to as an OS), etc. In the present embodiment, it is assumed that the built-in OS is a real-time OS, and each control program stored in the ROM 205 controls software execution in terms of scheduling, task switching, interrupt processing, etc., under the control of the real-time OS. Note that the interrupt process is a process executed when an interrupt request occurs such that the process is performed depending on the priority of the interrupt request. In a case where each CPU receives data or accepts an input given by a user via a key on the operation unit 218, the CPU is capable of detecting an interrupt request via the input/output control unit 213 and performing in real time an interrupt process associated with the interrupt request. In addition to interrupt processes, each CPU is also capable of performing a plurality of processes in parallel on the real-time OS depending on priority thereof. In a state in which there is no operation request to any CPU from the outside and any function of the MFP 100 such as a printing function, a reading function, or the like is not in operation, each CPU performs an idle task. A state in which an idle task is being performed is referred to as an idle state. In the idle state, each CPU waits for an interrupt request to occur. The idle task is lowest in priority of process, and thus, when a CPU in the idle state receives an interrupt request for any process, the CPU immediately executes the process specified by the received interrupt request. There are plurality of types of interrupt requests, and a user is allowed to set each interrupt request individually as to whether an interrupt for each interrupt request is enabled or disabled. By performing this setting, the user is allowed to set a transition condition described later.

The DRAM (Dynamic Random Access Memory) 208 stores program used in operations by the CPU 202 and CPU 210 and CPU 214. Note that the DRAM 208 is a storage unit that needs to be refreshed. The refresh process is a process to keep stored information. More specifically, in the refresh process on the DRAM 208, charges used to store information are refreshed. Note that the refresh process is performed periodically at predetermined time intervals (hereinafter referred to as refresh intervals). The DRAM 208 has two states, a normal refresh state and a self-refresh state. In the normal refresh state, when the DRAM 208 is accessed by the DRAM control unit 206 to perform the refresh process, the DRAM 208 performs the refresh process. Note that when the DRAM control unit 206 receives a trigger that is issued by a not-shown timer each time the refresh interval has elapsed, the DRAM control unit 206 accesses the DRAM 208 via the DRAM PHY 207 to perform the refresh process. On the other hand, in the self-refresh state, the DRAM 208 autonomously performs the refresh process at predetermined time intervals using a refresh circuit disposed in the DRAM 208 without being externally accessed. When the DRAM 208 is in the self-refresh state, it is not necessary to use an external refresh circuit, which makes it possible for the MFP 100 to reduce the consumption power. The DRAM 208 is connected to the DRAM PHY 207 that controls a physical layer of the DRAM 208. The DRAM PHY 207 is connected to the DRAM control unit 206 that controls a higher layer of the DRAM 208. Note that then DRAM control unit 206 may be connected directly to the DRAM 208 without the DRAM PHY 207 intervening. The CPU 202, the CPU 210, and the CPU 214 access the DRAM 208 via the DRAM control unit 206 and the DRAM PHY 207.

The USB control unit 209 is a control unit for realizing USB communication with an external apparatus connected via the USB connection unit 106. In a case where the USB control unit 209 receives data from an external apparatus connected via the USB connection unit 106 when the MFP 100 is in a power saving mode described later, the USB control unit 209 is capable of autonomously returning a NAK response to the external apparatus without the CPU 202 intervening. Note that the NAK response is a response that is returned, in response to transmission of data from an external apparatus connected via the USB connection unit 106, to notify the external apparatus that the MFP 100 is in a state in which the MFP 100 is not allowed to receive the data and to request the external apparatus to wait until it becomes possible to receive the data.

The input/output control unit 213 controls signals coming from respective connected units and notifies each CPU of the signals.

A system bus 212 is for connecting various units to each other in the MFP 100.

A printing unit 220 forms an image on a recording medium such as paper using a recording agent such as ink according to a print job received from an external apparatus connected via a network or the like, and the printing unit 220 outputs a printed result. A reading unit 219 reads a document set on a document plate according to a scan job or the like received from an external apparatus connected via a network or the like. The operation unit 218 accepts an input given by a user via various keys disposed on the operation unit 218. The display unit 215 includes an LCD 217 serving as a liquid crystal display and a display controller 216 that transfers information to be displayed and controls the content displayed on the LCD 217. Note that the display unit 215 corresponds to the display unit 102, and the operation unit 218 corresponds to the operation unit 103.

The network control unit 211 makes a connection to a network to connect an Internet provider, an external apparatus, or the like, and transmits or receives data, image information, or the like to or from the Internet provider or the external apparatus via the network. The connecting to the communication network may be performed by a known method such as HTTP, although a further detailed description thereof is omitted here. Note that in the present embodiment, in connecting to a network, the network control unit 211 may make a direct wireless connection or may make a connection indirectly via an access point on a wired network. The connection to the network may be realized, for example, by a wired LAN or a wireless LAN. Specific examples of communication methods for the connection include Wi-Fi (Wireless Fidelity), Bluetooth (registered trademark), NFC (Near Field Communication, ISO/IEC IS 18092), etc. Note that the network control unit 211 is capable of detecting packets flowing on a network into two types: a first type of packets allowed to be processed without the CPU 210 intervening; and a second type of packets to be processed by the CPU 210. The network control unit 211 processes the first type packets allowed to be processed without the CPU 210 intervening. This process may be performed even when the CPU 210 is in the sleep state. On the other hand, as for the second type of packets that need to be processed by the CPU 210, the packets are processed by the CPU 210 when the network control unit 211 issues an interrupt request to the CPU 210 to process the packets.

Figure 11:
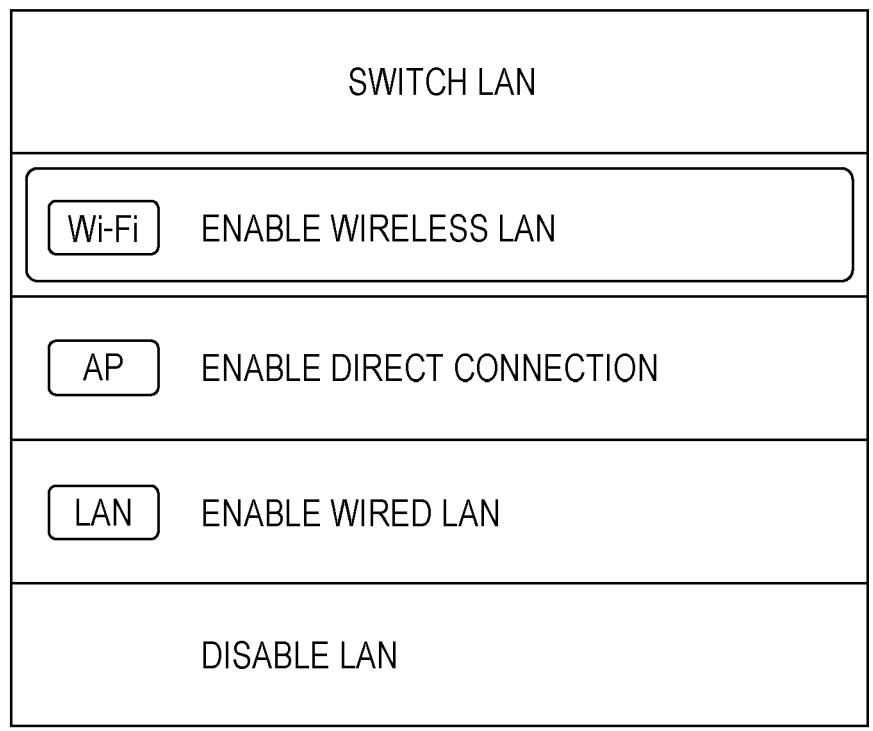
FIG. 11 is a diagram illustrating an example of a user interface (UI) for setting network connection of a communication apparatus according to an embodiment.

Furthermore, in the present embodiment, the MFP 100 is capable of setting whether network connection is enabled or disabled. To allow a user to make the setting as to the network connection, for example, a user interface (UI) for the setting of the network, such as that shown in FIG. 11, is displayed on the display unit 102. In the MFP 100, when one of "Enable Wireless LAN", "Enable Direct Connection", and "Enable Wired LAN" is selected by a key input operation on the operation unit 103, the network connection is set to be enabled. A specific example is described below as to the process of setting the network connection to be enabled. For example, in a case where "Enable Wireless LAN" is selected, the MFP 100 detects external apparatuses located near the MFP 100 and capable of being connected via wireless LAN communication, and the MFP 100 displays a list of detected external apparatuses on the display unit 102. Thereafter, when a user selects a particular external apparatus, the MFP 100 accepts the selection and enables the wireless LAN connection to the selected external apparatus via the network control unit 211. In a case, for example, where "Enable Direct Connection" is selected, the MFP 100 enables a not-shown access point in the network control unit 211. Thereafter, when the external apparatus detects this access point, it becomes possible for the MFP 100 to make the connection to the external apparatus via the access point. On the other hand, for example, in a case where "Enable Wired LAN" is selected, it becomes possible for the MFP 100 to make the wired LAN connection to the external apparatus via a wired LAN connected to a not-shown wired LAN connection unit disposed in the network control unit 211. When network connection is set to be enabled in the above-described manner, it becomes possible for the MFP 100 to perform network communication with an external apparatus via the network control unit 211. On the other hand, in a case where "Disable LAN" is selected by a user by inputting a key on the operation unit 103, the MFP 100 sets network connection to be disabled. A specific example is described below as to the process of setting connection to network to be disabled. For example, in the case where "Disable LAN" is selected, the MFP 100 disconnects all the above-described connections to the network to disable the connection to the network. The network control unit 211 controls the connection to the network according to the setting in terms of the connection to the network. Note that in the present embodiment, a user is allowed to arbitrarily make setting of the MFP 100 as to the connection to the network. The setting of the network may be performed by a user by selecting "enable" or "disable" via a UI such as that shown in FIG. 11, or the setting may be performed in advance before shipping.

The MFP 100 is capable of receiving a job such as a print job, a reading job, or the like from an external apparatus connected via a USB connection or a network, and is capable of executing a process according to the received job. More specifically, for example, when the MFP 100 receives a print job, the MFP 100 performs various kinds of image processes such as smoothing, a recording concentration correction process, a color correction process, or the like on image data included in the print job using a non-illustrated image processing control unit thereby converting the image data to high-precision image data. Thereafter, the MFP 100 prints an image on a printing sheet using the printing unit 220 according to the converted image data and the print job. In a case where the MFP 100 receives a reading job, the MFP 100 reads a document set on a document plate using the reading unit 219. Thereafter, the MFP 100 converts the read image to electric image data, and performs various kinds of image processing such as a banalization process, a half-tone process, or the like using the non-illustrated image processing control unit thereby outputting high-precision image data. The MFP 100 is also capable of transmitting the image data read via the reading unit 219 to an external communication apparatus to store the image data therein.

The power control apparatus 228 supplies power to various parts of the MFP 100, such as the data processing unit 201, the printing unit 220, the reading unit 219, the display unit 215, the network control unit 211, and the like.

Figure 3:
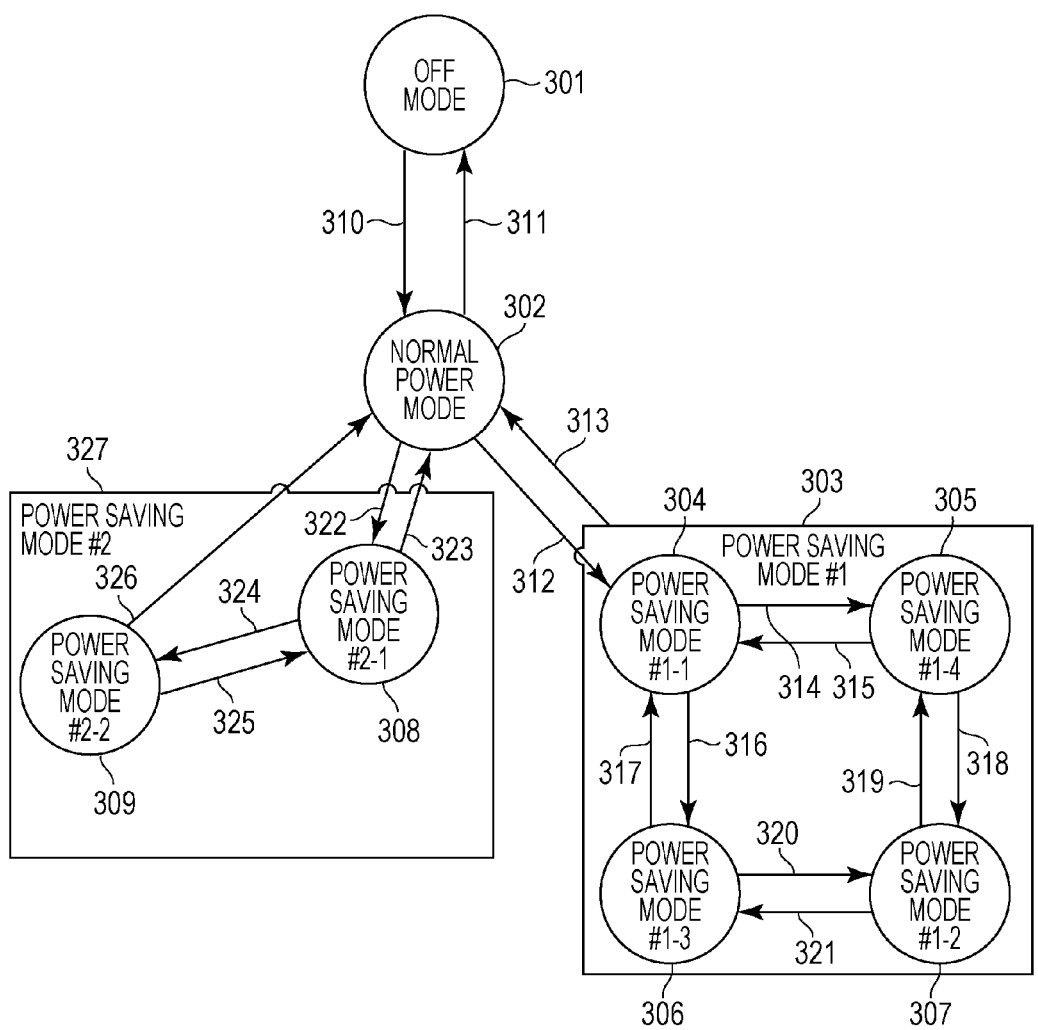
FIG. 3 is a diagram illustrating manner in which a mode of a communication apparatus is changed according to an embodiment.

FIG. 3 is a mode transition diagram associated with the MFP 100. In the present embodiment, modes are defined depending on a state of the power supply of the MFP 100. When one of transition conditions described later is satisfied, the MFP 100 goes to a mode depending on the satisfied one of transition conditions. Possible states of various parts of the MFP 100 in each mode, and conditions for each mode are described below with reference to FIG. 4 and FIG. 5.

First, the CPU 202, the CPU 210, and the CPU 214 are allowed to operate in one of power states: a normal state; a sleep state; and an OFF state. In the normal state, a clock and power necessary in a normal operation are supplied, and thus it is possible to access the DRAM 208 or the SRAM 204 and perform a process by executing a program stored in the DRAM 208 or the SRAM 204. In the sleep state, accessing to the DRAM 208, the SRAM 204, or the like is stopped and no process is performed although a clock and power are supplied. In the OFF state, power is not supplied.

The DRAM 208 operates in the normal refresh state or the self-refresh state as described above.

DRAM PHY 207 operates in an ON state or the OFF state. In the ON state, the clock and power are supplied and it is possible to execute functions of the DRAM PHY 207. In the OFF state, a clock and power are not supplied. When the DRAM PHY 207 goes to the OFF state, it becomes impossible for the CPU 202, the CPU 210, and the CPU 214 to access the DRAM, but it is possible to achieve a large reduction in the consumption power. This is because the clock supplied to the DRAM PHY 207 is higher in frequency by several times than other clocks, and the turning the DRAM PHY 207 into the OFF state causes supplying of this clock to the DRAM PHY 207 to be stopped.

The network control unit 211 operates in an active operating state or the OFF state. In the active operating state, power is supplied. When the network control unit 211 is in the active operating state, if network connection is enabled, the network control unit 211 is capable of performing a network control according to the setting. In the OFF state, power is not supplied. When the network control unit 211 is in the OFF state, it is not allowed to perform the network control, and thus the MFP 100 is not capable of connecting to a network.

The display unit 215 operates in the active operating state or the OFF state. In the active operating state, power is supplied. When the display unit 215 is in the active operating state, the display unit 215 is capable of displaying information on a screen under the control of the CPU 214. In the OFF state, power is not supplied. When the display unit 215 is in the OFF state, the display unit 215 is not capable of displaying information on the screen.

The frequency of the clock output by the clock generation unit 203 has a normal state, two low-frequency states (hereinafter referred to as a first low-frequency state and a second low-frequency state), and a lowest-frequency state. Note that in FIG. 4, the normal state, the first low-frequency state, the second low-frequency state, and the lowest-frequency state are respectively denoted as NORMAL, LOW #1, LOW #2, and LOWEST. The relationship in terms of the clock frequency among various states is as follows: lowest-frequency state<first low-frequency state<second low-frequency state<normal state. In the lowest-frequency state in which the clock has a lowest frequency, the clock allows the CPU 202 at least to detect pressing-down of a power switch disposed on the operation unit 103.

In an OFF mode 301, power is not supplied to parts of the MFP 100. Note that in this OFF mode 301, electric power is not supplied to all parts of the MFP 100, but electric power is supplied so as to allow the CPU 202 at least to detect pressing-down of the power switch on the operation unit 103. More specifically, for example, power is supplied only to the CPU 202, the clock generation unit 203, the SRAM 204, the ROM 205, the system bus 212, and the input/output control unit 213, but power is not supplied to the other parts. When the MFP 100 is in the OFF mode 301, the CPU 202 waits for the power key on the operation unit 103 to be pressed in a state in which the MFP 100 is connected to an outlet.

In a normal power mode 302, power is supplied to various parts of the MFP 100 such that the MFP 100 is allowed to execute all functions including a printing function, a reading function, and the like.

A transition condition 310 is a condition that the power key on the operation unit 103 is pressed down. When the MFP 100 is in the OFF mode 301, if the transition condition 310 is satisfied, the MFP 100 goes to the normal power mode 302. When the MFP 100 goes to the normal power mode 302, the MFP 100 performs a soft power-on process. In the soft power-on process, power is supplied to various parts of the MFP 100 to make it possible for the MFP 100 to execute various functions. The performing of the soft power-on process causes the MFP 100 to go to the normal power mode 302 from the OFF mode 301.

A transition condition 311 is a condition that the power key on the operation unit 103 is pressed down. If the transition condition 311 is satisfied when the MFP 100 is in the normal power mode 302, the MFP 100 goes to the OFF mode 301. When the MFP 100 goes to the OFF mode 301, the MFP 100 performs a soft power-off process. In the soft power-off process, supplying of power to various parts of the MFP 100 is stopped. In this soft power-off process, the MFP 100 does not stop supplying power to all parts, but supplying of power is limited such that it is still possible for the CPU 202 at least to detect pressing-down of the power key on the operation unit 103. The performing of the soft power-off process causes the MFP 100 to go to the OFF mode 301 from the normal power mode 302.

A first power saving mode (a power saving mode 303) has following four sub power saving modes: a first-of-first power saving mode (a power saving mode 304); a second-of-first power saving mode (a power saving mode 307); a third-of-first power saving mode (a power saving mode 306); and a fourth-of-first power saving mode (a power saving mode 305). The relationship in terms of the magnitude of reduction in power among sub power modes in the first power saving mode 303 is as follows: first-of-first power saving mode<fourth-of-first power saving mode≤power third-of-first saving mode<second-of-first power saving mode. A second power saving mode (power saving mode 327) has following two sub power modes: a first-of-second power saving mode (a power saving mode 308); and a second-of-first power saving mode (a power saving mode 309). The relationship in terms of the magnitude of reduction in power among sub power modes in the second power saving mode 327 is as follows: second-of second power saving mode<first-of-second power saving mode. The modes belonging to the power saving mode 303 and the power saving mode 327 are smaller in consumption power than the normal power mode 302, and thus they are referred to generically as power saving modes. As described above, the capability of changing to a plurality of power saving modes makes it possible for the MFP 100 to reduce the consumption power depending on the situation in which the MFP 100 is used.

In the present embodiment, when the power mode is changed from the normal power mode 302 to one of power saving modes belonging to the first power saving mode 303 or the second power saving mode 327, the destination power saving mode depends on whether the connection to the network is enabled or disabled. The first power saving mode 303 is a mode the transition to which is allowed when the network connection is set to be enabled. The second power saving mode 327 is a mode the transition to which is allowed when the network connection is disabled. In a case where the MFP 100 goes to the first power saving mode 303 from the normal power mode 302, the power mode first goes to the power saving mode 304. In the power saving mode 304, the CPU 202 and the CPU 210 are maintained in the active operating state because in the situation in which the MFP 100 is connected to a network, it is necessary to continue some network control even after the power mode is switched to the power saving mode. However, even when the MFP 100 is connected to a network, there may be a situation in which the CPU 202 and the CPU 210 do not need to operate. In such a situation, the present embodiment makes it possible for the MFP 100 to go to one of power saving modes 305 to 307 thereby achieving a large reduction in power consumption. When the MFP 100 tries to go to the power saving mode 327 from the normal power mode 302, the MFP 100 first goes to the power saving mode 308. In the power saving mode 308, only the CPU 202 goes to the sleep state, and almost other parts go to the OFF state. This is because the network control is not performed in the situation in which the MPF 100 is not connected to a network, parts such as the CPU 210 for the network control may not operate. In the present embodiment, when the power mode is changed from the normal power mode 302 to one of power saving modes, the destination power saving mode is determined based on the setting in terms of the connection to the network. Alternatively, the destination power saving mode may be determined not based on the setting but based on the actual network connection state, that is, based on whether the MFP 100 is actually connected to a network. More specifically, for example, in the case where the wired LAN connection is set to be enabled, it is checked whether the wired LAN is actually connected to a wired LAN connection unit (not illustrated) in the network control unit 211. In to be enabled, it is checked whether the network control unit 211 is connected to an external apparatus via the wireless connection according to the setting. The first power saving mode 303 is a mode to which it is allowed to go when the MFP 100 is connected to a network, while the second power saving mode 327 is a mode to which it is allowed to go when the MFP 100 is not connected to a network.

Various sub power saving modes in the respective first and second power saving modes 303 and 327, and conditions for transition to respective power saving modes are described in detail below.

The power saving mode 304 is a mode in which compared with states of various parts in the normal power mode 302, the states are different in that the CPU 214 is in the sleep state, the display unit 215 is in the OFF state, and the frequency of the clock output by the clock generation unit 203 is in the second low-frequency state. In the power saving mode 304, to perform the network control, the CPU 202 and the CPU 210 for performing the network control are maintained in operation. A transition condition 313 is that an interrupt request to one of CPUs for a process to be performed in the normal power mode 302 occurs. If the transition condition 313 is satisfied when the MFP 100 is in the power saving mode 304, the MFP 100 goes to the normal power mode 302. By controlling the state transition in the above-described manner, it becomes possible for the MFP 100 to return, even when the MFP 100 is in the power saving mode 304, to the normal power mode 302 in response to an occurrence of an interrupt request, which makes it possible to perform a process according to the interrupt request.

In the power saving mode 305, compared with power saving mode 304, states of parts are different in that further the CPU 210 is in the sleep state.

A transition condition 314 is a condition that the CPU 210 stays in the idle state over a predetermined time period. Even in a state in which network connection is set to be enabled, there may be a situation in which the CPU 210 does not perform network control, for example, as in a case where the network control unit 211 is not actually connected to an external apparatus. Therefore, in a case where the transition condition 314 is satisfied when the MFP 100 is in the power saving mode 304, the MFP 100 goes to the power saving mode 305. By controlling the state transition in the above-described manner, it becomes possible for the MFP 100, in a situation in which the CPU 210 does not perform network control and thus the CPU 210 does not operate, to go to a mode in which a further reduction in consumption power is achieved.

A transition condition 315 is that an interrupt request to the CPU 210 occurs or an interrupt request to one of CPUs for a process to be performed in the normal power mode 302 occurs. If the transition condition 315 is satisfied when the MFP 100 is in the power saving mode 305, the MFP 100 goes to the power saving mode 304. Note that in a case where the interrupt request that has occurred is an interrupt request to the CPU 210 for a process capable of being processed in the power saving mode, then the MFP 100 maintains the power saving mode 304 after the interrupt process is completed. The process capable of being processed in the power saving mode refers to a process capable of being processed using only parts that are in operation in the power saving mode, and an example of such a process performed by the CPU 210 is a process on packets flowing on a network. Therefore, an interrupt request to the CPU 210 for a process capable of being performed in the power saving mode may occur, for example, in a situation in which the MFP 100 is communicating with an external apparatus connected via a network. On the other hand, in a case where the interrupt request that has occurred is an interrupt request to one of CPUs for a process to be performed in the normal power mode 302, the MFP 100 first goes to the power saving mode 304 and further to the normal power mode 302 to perform the interrupt process. By controlling the state transition in the above-described manner, it becomes possible for the MFP 100 to return, even when the MFP 100 is in the power saving mode 305, to the power saving mode 304 or the normal power mode 302 in response to an occurrence of an interrupt request, which makes it possible to perform a process according to the interrupt request.

In the power saving mode 306, compared with power saving mode 304, states of parts are different in that the CPU 202 is in the sleep state.

A transition condition 316 is a condition that the CPU 202 stays in the idle state over a predetermined time period. Even in a state in which network connection is set to be enabled, there may be a situation in which the CPU 202 does not perform a process, for example, as in a case where job reception is not performed or a request is not issued for transmission of information on the status of the MFP 100. If the transition condition 316 is satisfied when the MFP 100 is in the power saving mode 304, the MFP 100 goes to the power saving mode 306. By controlling the state transition in the above-described manner, it becomes possible for the MFP 100, in a situation in which the CPU 202 does not operate, to go to a mode in which a further reduction in consumption power is achieved.

A transition condition 317 is that an interrupt request to the CPU 202 occurs or an interrupt request to one of CPUs for a process to be performed in the normal power mode 302 occurs. If the transition condition 317 is satisfied when the MFP 100 is in the power saving mode 306, the MFP 100 goes to the power saving mode 304. Note that in a case where the interrupt request that has occurred is an interrupt request to the CPU 202 for a process capable of being processed in the power saving mode, the MFP 100 maintains the power saving mode 304 after the interrupt process is completed. Examples of such processes capable of being processed in the power saving mode by the CPU 210 include a process of transmitting information on the status of the MFP 100, a process of transmitting information indicating whether a memory card is inserted in the MFP 100, etc. Therefore, an interrupt request to the CPU 202 for a process capable of being performed in the power saving mode may occur, for example, in a situation in which a screen is displayed for notifying an external apparatus connected via a network of the status of the MFP 100. On the other hand, in a case where the interrupt request that has occurred is an interrupt request to one of CPUs for a process to be performed in the normal power mode 302, the MFP 100 first goes to the power saving mode 305 and further to the normal power mode 302 to perform the interrupt process. By controlling the state transition in the above-described manner, it becomes possible for the MFP 100 to return, even when the MFP 100 is in the power saving mode 306, to the power saving mode 304 or the normal power mode 302 in response to an occurrence of an interrupt request to the CPU 202, which makes it possible to perform a process according to the interrupt request.

In the power saving mode 307, compared with power saving mode 304, states of parts are different in that the CPU 202 and the CPU 210 are in the sleep state, and the DRAM 208 is in the self-refresh state. In the power saving mode 307, the DRAM 208 is controlled to be in the self-refresh state, and thus it becomes possible to further reduce the consumption power compared with the case in which all CPUs are simply in the sleep state.

A transition condition 318 is that no access to the DRAM 208 is occurring. If the transition condition 318 is satisfied when the MFP 100 is in the power saving mode 305, the MFP 100 goes to the power saving mode 307. By controlling the state transition in the above-described manner, it becomes possible for the MFP 100, in a situation in which no accessing to the DRAM 208 occurs and no CPUs are in operation, to go to a mode in which a further reduction in consumption power is achieved.

A transition condition 319 is that an interrupt request to the CPU 202 occurs or an interrupt request to one of CPUs for a process to be performed in the normal power mode 302 occurs. If the transition condition 319 is satisfied when the MFP 100 is in the power saving mode 307, then the MFP 100 goes to the power saving mode 305. Note that in a case where the interrupt request that has occurred is an interrupt request to the CPU 202 for a process capable of being processed in the power saving mode, the MFP 100 maintains the power saving mode 305 after the interrupt process is completed. On the other hand, in a case where the interrupt request that has occurred is an interrupt request to one of CPUs for a process to be performed in the normal power mode 302, the MFP 100 first goes to the power saving mode 305 and then further goes to the normal power mode 302 via the power saving mode 304 to perform the interrupt process. By controlling the state transition in the above-described manner, it becomes possible for the MFP 100 to return, even when the MFP 100 is in the power saving mode 307, to the power saving mode 305 or the normal power mode 302 in response to an occurrence of an interrupt request to the CPU 202, which makes it possible to perform a process according to the interrupt request.

A transition condition 320 is that no access to the DRAM 208 is occurring. In a case where the transition condition 320 is satisfied when the MFP 100 is in the power saving mode 306, the MFP 100 goes to the power saving mode 307. By controlling the state transition in the above-described manner, it becomes possible for the MFP 100, in a situation in which no accessing to the DRAM 208 occurs and no CPUs are in operation, to go to a mode in which a further reduction in consumption power is achieved.

A transition condition 321 is that an interrupt request to the CPU 210 occurs or an interrupt request to one of CPUs for a process to be performed in the normal power mode 302 occurs. If the transition condition 321 is satisfied when the MFP 100 is in the power saving mode 307, the MFP 100 goes to the power saving mode 306. Note that in a case where the interrupt request that has occurred is an interrupt request to the CPU 210 for a process capable of being processed in the power saving mode, the MFP 100 maintains the power saving mode 306 after the interrupt process is completed. On the other hand, in a case where the interrupt request that has occurred is an interrupt request to one of CPUs for a process to be performed in the normal power mode 302, the MFP 100 first goes to the power saving mode 306 and then further to the normal power mode 302 via the power saving mode 304 to perform the interrupt process. By controlling the state transition in the above-described manner, it becomes possible for the MFP 100 to return, even when the MFP 100 is in the power saving mode 307, to the power saving mode 306 in response to an occurrence of an interrupt request to the CPU 210, which makes it possible to perform a process according to the interrupt request.

In a case where in the power saving mode 307, an interrupt request to one of CPUs for a process to be performed in the normal power mode 302 occurs, the transition to the normal power mode 302 may be performed via the power saving mode 305 or power saving mode 306. However, in a case where an interrupt request for a process to be performed in the normal power mode 302 is issued via USB communication, the CPU 202 needs to operate, and thus the transition to the normal power mode 302 is performed via the power saving mode 305. On the other hand, in a case where an interrupt request for a process to be performed in the normal power mode 302 is issued via network communication, the CPU 210 needs to operate, and thus the transition to the normal power mode 302 is performed via the power saving mode 306.

In the power saving mode 308, compared with the normal power mode 302, the states of parts are different in that the CPU 202 and the CPU 214 are in the sleep state, and the CPU 210, the display unit 215, the network control unit 211, and the DRAM PHY 207 are in the OFF state. Furthermore, in the power saving mode 308, the frequency of the clock output by the clock generation unit 203 is in the first low-frequency state, and the DRAM 208 is in the self-refresh state. In the power saving mode 308, it is not necessary to perform the network control, it is allowed to stop operations of many parts of the MFP 100, and thus it is possible to achieve a large reduction in the power consumption. Note that in a case where the DRAM PHY 207 is in the OFF state, it is not allowed to access the DRAM 208 although a reduction in the consumption power is achieved. Furthermore, in this case, it takes a long time to return to a state in which it is allowed to access the DRAM 208. Accessing the DRAM 208 frequently occurs when the network is set to be enabled, and thus in the first power saving mode 303, the DRAM PHY 207 does not go to the OFF state to prevent the throughput from being influenced by an increase in returning time. On the other hand, in the power saving mode 327, the DRAM PHY 207 goes to the OFF state, because in the situation in which network connection is set to be disabled, accessing the DRAM 208 does not occur frequently, and thus a returning time may be allowable.

A transition condition 322 is that network connection is set to be disabled, and an interrupt request to any CPU for a process to be performed in the normal power mode 302 has not occurred within a predetermined period. If the transition condition 322 is satisfied when the MFP 100 is in the normal power mode 302, the MFP 100 goes to the power saving mode 308. By controlling the state transition in the above-described manner, it becomes possible for the MFP 100, in a situation in which any function of the MFP 100 is not used, to go to a mode in which a further reduction in consumption power is achieved.

A transition condition 323 is that an interrupt request to one of CPUs other than an interrupt request in response to reception of data occurs. In a case where the transition condition 323 is satisfied when the MFP 100 is in the power saving mode 308, the MFP 100 goes to the normal power mode 302. By controlling the state transition in the above-described manner, it becomes possible for the MFP 100 to return, even when the MFP 100 is in the power saving mode 308, to the normal power mode 302 in response to an interrupt request issued by operating a key on the operation unit 103, which makes it possible to perform a process according to the interrupt request. Note that the transition condition 323 does not include an occurrence of interrupt request in response to reception of data, because some interrupt requests in response to reception of data are interrupt requests for processes capable of being performed in the power saving mode.

In the power saving mode 309, compared with power saving mode 308, states of parts are different in that the CPU 202 is in the active operating state, the DRAM 208 is in the normal refresh state, and the DRAM PHY 207 is in the ON state. In the power saving mode 309, data (other than data associated with a job) received from an external apparatus is processed while reducing the consumption power.

A transition condition 324 is that an interrupt request occurs in response to reception of data. In a case where the transition condition 324 is satisfied when the MFP 100 is in the power saving mode 308, the MFP 100 goes to the power saving mode 309. Note that in a case where the interrupt request that has occurred is an interrupt request for a process allowed to be performed in the power saving mode, the MFP 100 maintains the power saving mode 309 after the interrupt process is completed. On the other hand, in a case where the interrupt request that has occurred is an interrupt request to one of CPUs for a process to be performed in the normal power mode 302, the MFP 100 first goes to the power saving mode 309 and then further to the normal power mode 302 to perform the interrupt process. By controlling the state transition in the above-described manner, it becomes possible for the MFP 100 to perform a process associated with data when the MFP 100 receives the data from an external apparatus even when the MFP 100 is in the power saving mode 308. Note that in the present embodiment, in a case where the interrupt request that occurs in the power saving mode 308 in response to reception of data is an interrupt request for a process to be performed in the normal power mode 302, the MFP 100 does not directly go to normal power mode 302. This is because the CPU 202 is not in operation in the power saving mode 308, and thus the MFP 100 is not capable of determining the content of the received data, and is not capable of determining whether the interrupt request to the CPU 202 is an interrupt request for a process to be performed in the normal power mode 302.

A transition condition 325 is that an interrupt request for a process to be performed in the normal power mode 302 has not been issued to any CPU within a predetermined period. In a case where the transition condition 325 occurs when the MFP 100 is in the power saving mode 309, the MFP 100 goes to the power saving mode 308. By controlling the state transition in the above-described manner, it becomes possible for the MFP 100 to return to the power saving mode 309 when the function of the MFP 100 is no longer used after the end of the process on the received data, which makes it possible to reduce the consumption power.

A transition condition 326 is that an interrupt request to one of CPUs for a process to be performed in the normal power mode 302 occurs. In a case where the transition condition 326 occurs when the MFP 100 is in the power saving mode 309, the MFP 100 goes to the normal power mode 302. By controlling the state transition in the above-described manner, it becomes possible for the MFP 100 to return to the normal power mode 302 from the power saving mode 309 when it becomes necessary to perform a process which is not allowed to perform in the power saving mode 309 thereby making it possible to perform this process.

Details of the respective transition conditions are not limited to those described above, but the transition conditions may be defined arbitrarily. The transition conditions may be defined, for example, in terms of which type of interrupt request occurs, or in terms of a length of elapsed time before mode transition occurs. The length of elapsed time before mode transition may be set to, for example, 5 minutes, 30 minutes, 60 minutes, etc. The transition conditions may be set by accepting inputting given by a user via a transition condition setting screen displayed on the display unit 215, or may be set remotely on an external communication apparatus connected to the MFP 100. Alternatively, a user may be allowed to specify transition conditions by directly inputting on a setting screen. Alternatively, a plurality of options may be prepared in advance and they may be displayed on a setting screen such that a user is allowed to select one of options. Alternatively, transition conditions may be set in advance before shipping.

The DRAM 208 stores information on an elapsed time since the transition condition is satisfied. The elapsed time is counted by a timer (not illustrated) disposed in the MFP 100 by incrementing the count value until the count value reaches a set time defined in an automatic power-off function or decrementing the count value from the set time defined in the automatic power-off function. Alternatively, a not-shown TCU (Timer Counter Unit) may generate a pulse at a frequency specified by the CPU 202 and the elapsed time may be counted based on the pulse frequency and the number of times the timer has received the pulse. The mode transition is performed, for example, when one of CPUs determines, based on a comparison between the elapsed time and the set time defined in the transition condition, that the mode transition is to be performed. The elapsed time is reset when the transition condition is satisfied, and counting of the elapsed time is restarted after the elapsed time is reset. As for the set time, the same value may be used for all transition conditions, or the value may be individually set for each transition condition. In the present embodiment, by way of example, the timer separately counts the elapsed time (T1) to control the state transition of the CPU 202 and the elapsed time (T2) to control the state transition of the CPU 210.

Figure 9:
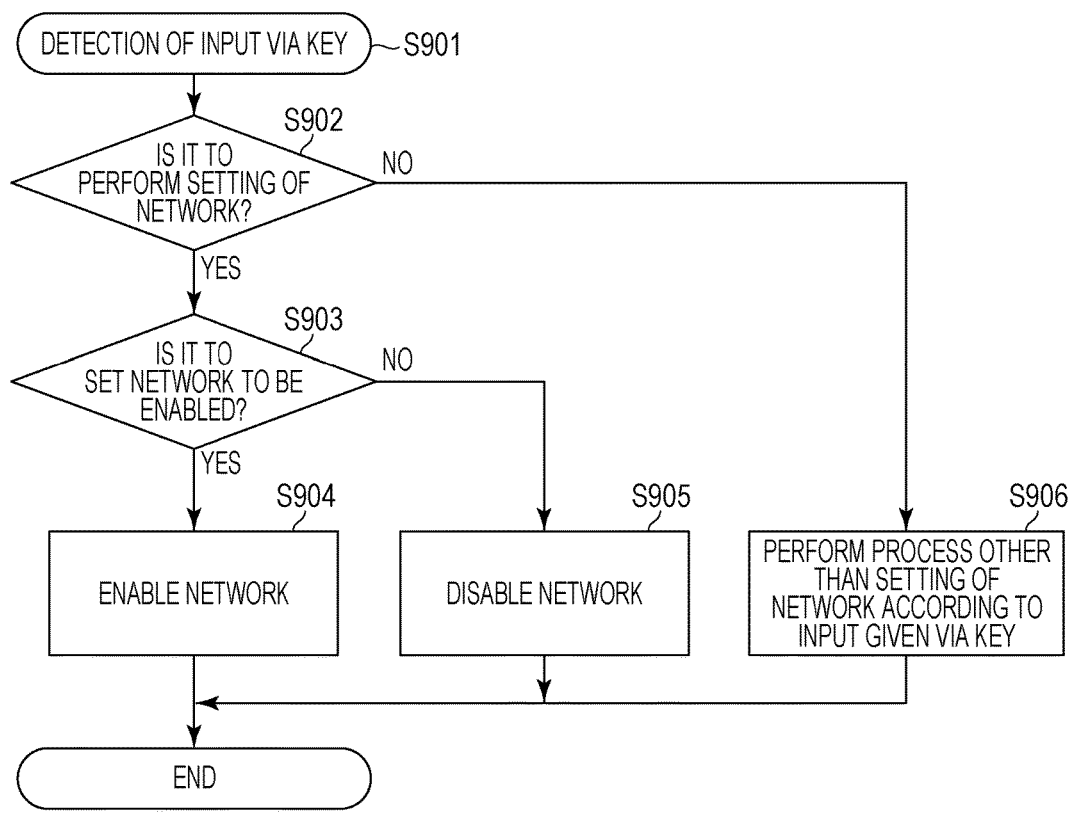
FIG. 9 is a flow chart illustrating a process performed by a communication apparatus in response to a key input operation according to an embodiment.

FIG. 9 is a flow chart illustrating a process performed by the MFP 100 when a key on the operation unit 103 is operated for inputting. Note that the process shown in this flow chart is performed by the CPU 202 such that the CPU 202 loads a control program stored in the ROM 205 or a not-shown HDD into the SRAM 204 or the DRAM 208 and the CPU 202 executes this control program. The process of this flow chart is performed in a state in which a user interface (UI) such as that shown in FIG. 11 for setting the network connection is displayed on the display unit 102.

First, in S901, the CPU 202 detects inputting of a key on the operation unit 103 given by a user.

Next, in S902, the CPU 202 detects the content of the inputting given in S901 and determines whether or not to perform setting of network connection. More specifically, for example, when the CPU 202 detects that one of "Enable Wireless LAN", "Enable Direct Connection", "Enable Wired LAN", and "Disable LAN" illustrated in FIG. 11 is selected by inputting a key on the operation unit 103, the CPU 202 determines that setting of network connection is to be performed. On the other hand, when an END key (not shown) or the like is input, the CPU 202 determines that setting of network connection is not to be performed. In a case where it is determined that setting of network connection is to be performed, the CPU 202 performs a process in S903. However, in a case where it is determined that setting of network connection is not to be performed, the CPU 202 performs a process in S906 according to the input given in S901.

In S903, the CPU 202 makes a determination, based on the content of the input given in S901, as to whether network connection is set to be enabled. More specifically, for example, in a case where one of "Enable Wireless LAN", "Enable Direct Connection", and "Enable Wired LAN" is selected by the inputting of the key on the operation unit 103, the CPU 202 determines that network connection is set to be enabled. In a case where "Disable LAN" illustrated in FIG. 11 is selected by a key input operation on the operation unit 103, the CPU 202 determines that network connection is set to be disabled. In the case where it is determined that network connection is set to be enabled, the CPU 202 performs a process in S904. On the other hand, in a case where it is determined that network connection is set to be disabled, the CPU 202 performs a process in S905.

In S904, the CPU 202 sets the network connection to be enabled. More specifically, the CPU 202 performs a process to connect to a specific network according to the content of the input given in S901.

In S905, the CPU 202 performs setting so as to disable network connection such that the MFP 100 is not allowed to connect to a network.

By controlling the process in the above-described manner, the MFP 100 is capable of performing setting in terms of network connection according to an operation performed by a user.

Figure 8A:
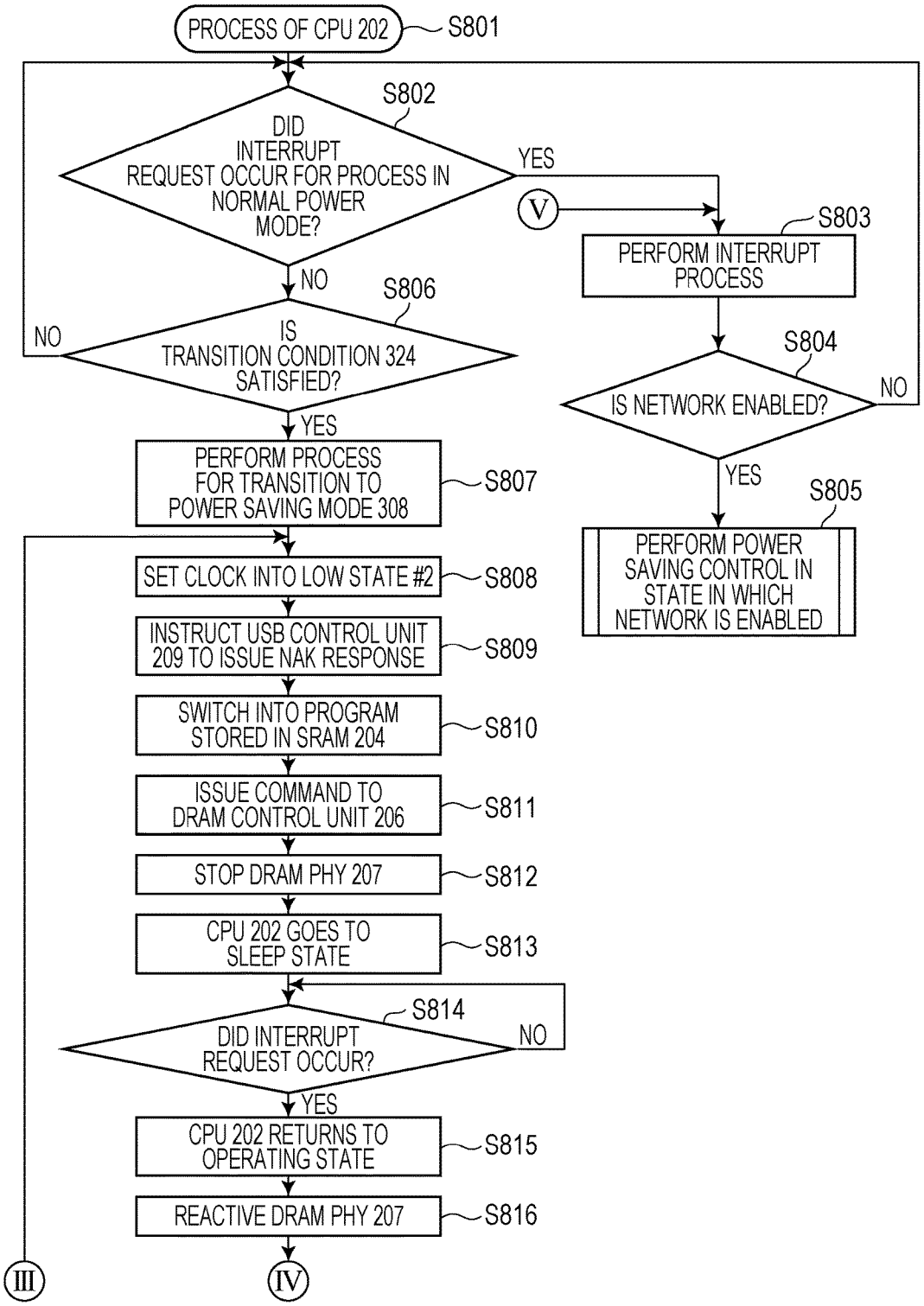

FIGS. 8A and 8B are flow charts illustrating a process performed by the CPU 202 when network connection is set to be disabled or when a connection to a network is not established. Note that the process shown in this flow chart is performed by the CPU 202 such that the CPU 202 loads a control program stored in the ROM 205 or a not-shown HDD into the SRAM 204 or the DRAM 208 and the CPU 202 executes this control program. Note that this process shown in the flow chart is started in a state (in S801) in which network connection is set to be disabled or no connection to network is established, and the MFP 100 is in the normal power mode 302.

First, in S802, the CPU 202 determines whether an interrupt request to the CPU 202 for a process to be performed in the normal power mode 302 has occurred. In a case where it is determined that an interrupt request for a process to be performed in the normal power mode 302 has occurred, the CPU 202 performs a process in S803. However, in a case where it is determined that an interrupt request for a process to be performed in the normal power mode 302 has not occurred, the CPU 202 performs a process in S806.

In S803, the CPU 202 performs a process according to the interrupt request to the CPU 202 for the process to be performed in the normal power mode 302. In this process, the CPU 202 resets an elapsed time (T1) counted by a timer. Thereafter, the CPU 202 performs the process in S804.

In S804, the CPU 202 determines whether network connection is set to be enabled or not. The setting in terms of network connection is performed according to the method described above with reference to the flow chart of FIG. 9. In a case where it is determined that network connection is set to be enabled, the CPU 202 advances the process to S805 and the CPU 202 performs, as described later, a process to be performed by the CPU 202 in the state in which the connection to network is enabled. On the other hand, in a case where it is determined that network connection is set to be disabled, the processing flow returns to S802. Note that in S804 the CPU 202 may determine whether the MFP 100 is actually connected to a network or not. In a case where it is determined that the MFP 100 is actually connected to a network, the CPU 202 performs the process in S805. In a case where it is determined that the MFP 100 is not connected to a network, the processing flow returns to S802.

In S806, the CPU 202 determines whether the transition condition 322 is satisfied. In this step, the CPU 202 determines whether an elapsed time (T1) counted, for example, by a timer is larger than a set time defined in the transition condition 322. In a case where the timer counts down the elapsed time (T1), the CPU 202 may determine whether the elapsed time (T1) has reached 0. In a case where the timer counts the number of pulses generated by a TCU, the CPU 202 may determine whether the counted number of pulses has reached a value corresponding to the set time defined in the transition condition 322. In a case where it is determined that the transition condition 322 is satisfied, the CPU 202 performs a process in S807. However, in a case where it is determined that the transition condition 322 is not satisfied, the CPU 202 again performs the process in S802.

In S807, the CPU 202 performs a process to control the MFP 100 to go to the power saving mode 308 from the normal power mode 302. More specifically, for example, the CPU 202 controls the MFP 100 such that the CPU 210, the network control unit 211, and the display unit 215 go to the OFF state, and the CPU 214 goes to the sleep state.

In S808, the CPU 202 controls the frequency of the clock output by the clock generation unit 203 to go to the first low-frequency state.

In S809, the CPU 202 instructs the USB control unit 209 to issue a NAK response.

In S810, the CPU 202 switches a program used in operation of the CPU 202 from a program stored in the DRAM 208 to a program stored in the SRAM 204.

In S811, the CPU 202 issues a command to the DRAM control unit 206 to enable the DRAM control unit 206 to force the DRAM 208 to go to the self-refresh state. Receiving this command from the CPU 202 makes it possible for the DRAM control unit 206 to controls the DRAM 208 to go to the self-refresh state. Details of the process performed by the DRAM control unit 206 to control the DRAM 208 to go to the self-refresh state will be described later.

In S812, the CPU 202 controls the DRAM PHY 207 to go to the OFF state.

In S813, the CPU 202 goes to the sleep state from the active operating state. At this point of the process flow, the transition of the MFP 100 to the power saving mode 308 is completed.

In S814, the CPU 202 determines whether an interrupt request has occurred. In a case where it is determined that an interrupt request has occurred, the CPU 202 performs a process in S815. However, in a case where it is determined that no interrupt request has occurred, the CPU 202 again performs the process in S814.

In S815, the CPU 202 goes to the active operating state from the sleep state.

In S816, the CPU 202 controls the DRAM PHY 207 to goes to the ON state.

In S817, the CPU 202 issues a command to the DRAM control unit 206 to disable the DRAM control unit 206 to make the DRAM 208 go to the self-refresh state. Receiving this command from the CPU 202 makes it impossible for the DRAM control unit 206 to make the DRAM 208 go to the self-refresh state.

In S818, the CPU 202 switches a program used in operation of the CPU 202 from a program stored in the SRAM 204 to a program stored in the DRAM 208.

In S819, the CPU 202 instructs the USB control unit 209 to issue an ACK response.

In S820, the CPU 202 determines whether the interrupt request that has occurred is an interrupt request in response to reception of data. This determination is made to determine whether the CPU 202 is to go to the normal power mode 302 and perform a process according to the interrupt request that has occurred or to go to the power saving mode 309 and perform a process according to the interrupt request that has occurred. In a case where it is determined that the interrupt request that has occurred is not an interrupt request in response to reception of data, the CPU 202 performs a process in S821. However in a case where it is determined that the interrupt request that has occurred is an interrupt request in response to reception of data, the CPU 202 performs a process in S823.

In S821, the CPU 202 controls the frequency of the clock output by the clock generation unit 203 to go to the normal state.

In S822, the CPU 202 performs a process to control the MFP 100 to go to the normal power mode 302 from the power saving mode 308. More specifically, for example, the CPU 202 controls the MFP 100 such that the CPU 210, the CPU 214, the network control unit 211, and the display unit 215 go to the active operating state. Thereafter, the CPU 202 performs a process in S803 to execute an interrupt process according to the interrupt request that has occurred.

In S823, the CPU 202 controls the frequency of the clock output by the clock generation unit 203 to go to the second low-frequency state. As a result, the MFP 100 goes to the power saving mode 309 from the power saving mode 308.

In S824, the CPU 202 determines whether the interrupt request, determined in S820 as an interrupt request in response to reception of data, is an interrupt request in response to reception of a job. In a case where the interrupt request of interest is that in response to reception of a job, it is necessary to perform the process in the normal power mode 302. Therefore, in a case where it is determined that the interrupt request of interest is an interrupt request in response to reception of the job, the CPU 202 performs a process in step S821 and following steps to make the MFP 100 go to the normal power mode. On the other hand, in a case where it is determined that the interrupt request of interest is not an interrupt request in response to job reception, the CPU 202 performs a process in S825. The reason why the determination in S824 is performed after the MFP 100 goes to the power saving mode 309 is that the CPU 202 cannot know the cause of the interrupt request in response to the data reception until the MFP 100 has actually received data.

In S825, the CPU 202 executes an interrupt process according to the interrupt request that has occurred. In this process, the CPU 202 resets the elapsed time (T1) counted by the timer. Note that the process in S825 is a process according to an interrupt request in response to reception of data other than a job, and this process is capable of being performed in the power saving mode.

In S826, as in S814, the CPU 202 determines whether an interrupt request has occurred. In a case where it is determined that an interrupt request has occurred, the CPU 202 performs a process in S827. However, in a case where it is determined that no interrupt request has occurred, the CPU 202 performs a process in S829.

In S827, as in S820, the CPU 202 determines whether the interrupt request that has occurred is an interrupt request in response to reception of data. This determination is made to determine whether the CPU 202 is to perform a process according to the interrupt request that has occurred while maintaining the MFP 100 in the power saving mode 309 or the CPU 202 is to perform a process according to the interrupt request that has occurred after the MFP 100 is made to go to the normal power mode 302. In a case where it is determined that the interrupt request of interest is an interrupt request in response to reception of data, the CPU 202 performs a process in S828. However in a case where it is determined that the interrupt request of interest is not an interrupt request in response to reception of data, the CPU 202 performs a process in S821.

In S828, as in S824 the CPU 202 determines whether the interrupt request, determined in S827 as an interrupt request in response to reception of data, is an interrupt request in response to job reception. In a case where it is determined that the interrupt request of interest is an interrupt request in response to job reception, the CPU 202 performs a process in step S821 and following steps to make the MFP 100 go to the normal power mode. On the other hand, in a case where it is determined that the interrupt request of interest is not an interrupt request in response to job reception, the CPU 202 again performs the process in S825.

In S829, as in S806, the CPU 202 determines whether the transition condition 325 is satisfied. In a case where it is determined that the transition condition 325 is satisfied, the CPU 202 again performs the process in S808 to make the MFP 100 again go to the power saving mode 308. However, in a case where it is determined that the transition condition 325 is not satisfied, the CPU 202 again performs the process in S826.

By controlling the process in the above-described manner, it becomes possible for the MFP 100 to go to a power saving mode in which a large reduction in consumption power is achieved, because it is not necessary to perform network control when network connection is set to be disabled. Furthermore, the MFP 100 is capable of changing the mode properly according to the respective transition conditions.

Figure 6A:
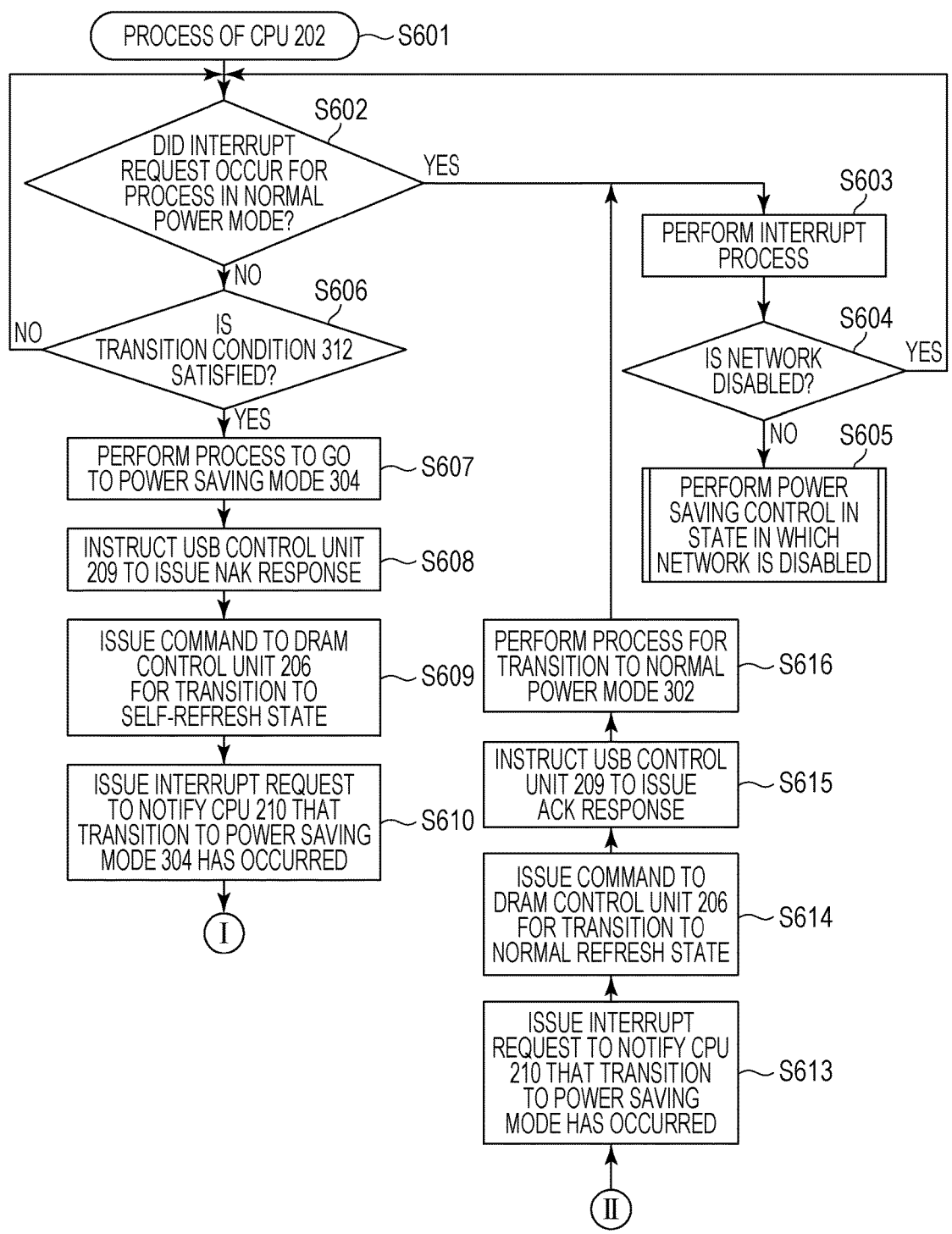
FIGS. 6A and 6B are flow charts illustrating a process performed by a main CPU of a communication apparatus in a situation in which network connection is set to be enabled according to an embodiment.
Figure 6B:
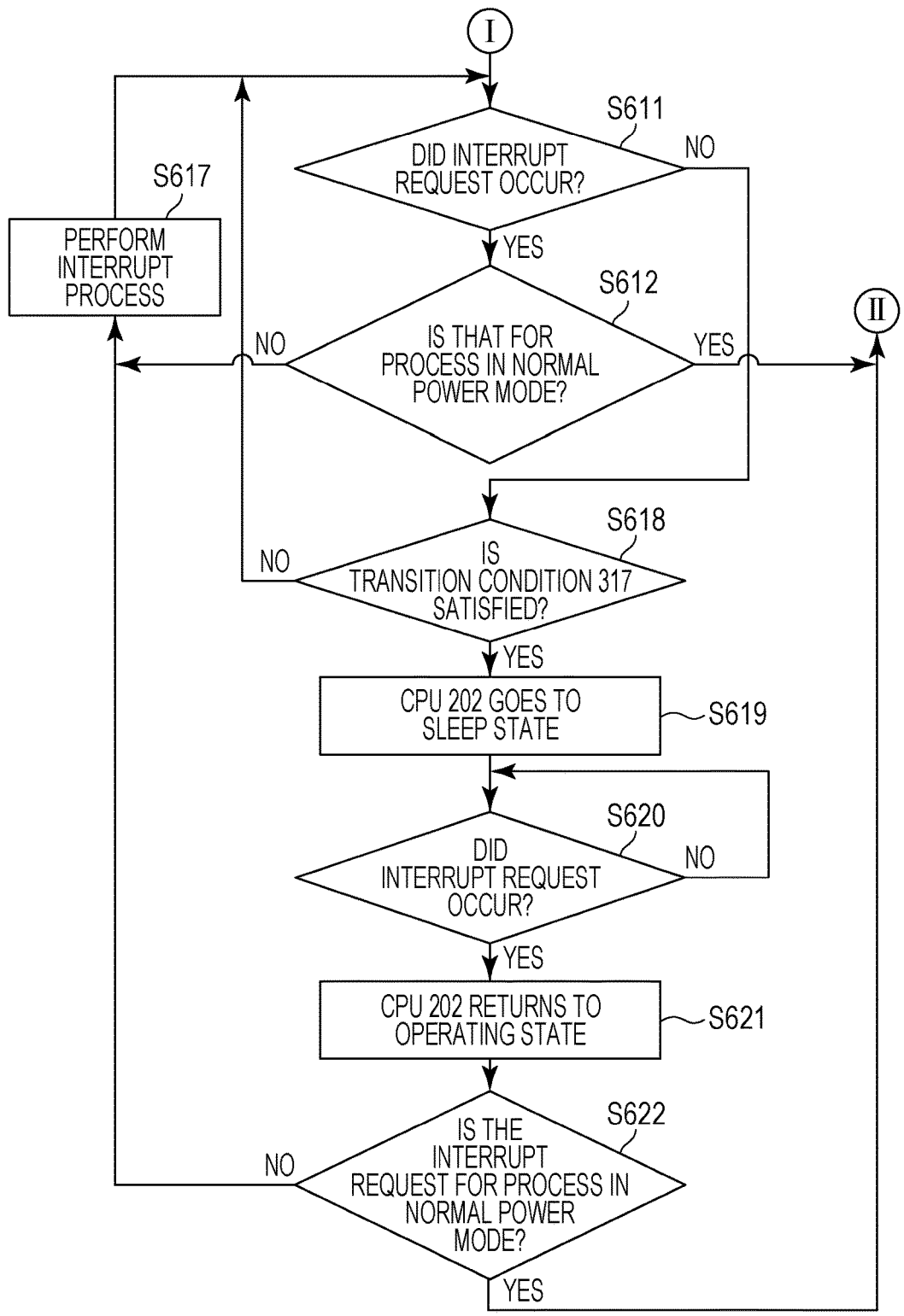

FIGS. 6A and 6B are flow charts illustrating a process performed by the CPU 202 when network connection is set to be enabled or when a connection to a network is established. Note that the process shown in this flow chart is performed by the CPU 202 such that the CPU 202 loads a control program stored in the ROM 205 or a not-shown HDD into the SRAM 204 or the DRAM 208 and the CPU 202 executes this control program. Note that this process shown in the flow chart is started in a state (in S601) in which network connection is set to be enabled or connection to network is made, and the MFP 100 is in the normal power mode 302.

First, in S602, the CPU 202 determines whether an interrupt request to the CPU 202 for a process to be performed in the normal power mode 302 has occurred. In a case where it is determined that an interrupt request to the CPU 202 for a process to be performed in the normal power mode 302 has occurred, the CPU 202 performs a process in S603. However, in a case where it is determined that an interrupt request for a process to be performed in the normal power mode 302 has not occurred, the CPU 202 performs a process in S606.

In S603, the CPU 202 performs a process according to the interrupt request to the CPU 202 for the process to be performed in the normal power mode 302. In this process, the CPU 202 resets an elapsed time (T1) counted by a timer. Thereafter, the CPU 202 performs a process in S604.

In S604, the CPU 202 determines whether network connection is set to be enabled or not. The setting of the network connection is performed according to the method shown in the flow chart of FIG. 9. In a case where it is determined that network connection is set to be enabled, the CPU 202 returns the process to S602. On the other hand, in a case where it is determined that network connection is set to be disabled, the processing flow proceeds to S605 in which the CPU 202 performs the process to be performed in the state in which network connection is disabled. In S604, alternatively, the CPU 202 may determine whether the MFP 100 is connected to a network or not. In a case where it is determined that the MFP 100 is connected to a network, the CPU 202 returns the process to S602, but in a case where it is determined that the MFP 100 is not connected to a network, the CPU 202 performs a process in S605.

In S606, the CPU 202 determines whether the transition condition 312 is satisfied. More specifically, in this step S606, for example, the CPU 202 determines whether an elapsed time (T1) counted by a timer is larger than a set time defined in the transition condition 312. In a case where the timer counts down the elapsed time (T1), the CPU 202 may determine whether the elapsed time (T1) has reached 0. In a case where the timer counts the number of pulses generated by a TCU, the CPU 202 may determine whether the counted number of pulses has reached a value corresponding to the set time defined in the transition condition 312. In a case where it is determined that the transition condition 312 is satisfied, the CPU 202 performs a process in S607. However, in a case where it is determined that the transition condition 312 is not satisfied, the CPU 202 again performs the process in S602.

In S607, the CPU 202 performs a process to control the MFP 100 to go to the power saving mode 304 from the normal power mode 302. More specifically, for example, the CPU 202 controls the MFP 100 such that the CPU 214 goes to the sleep state, the display unit 215 goes to the OFF state, and the frequency of the clock output by the clock generation unit 203 goes to the second low-frequency state.

In S608, the CPU 202 instructs the USB control unit 209 to issue a NAK response.

In S609, the CPU 202 issues a command to the DRAM control unit 206 to enable the DRAM control unit 206 to force the DRAM 208 to go to the self-refresh state.

In S610, the CPU 202 issues an interrupt request for notifying the CPU 210 that the power mode has been switched to the power saving mode 304. Receiving this interrupt request from the CPU 202 makes it possible for the CPU 210 to go to the sleep state. Details of the process performed by the CPU 210 will be described later.

In S611, the CPU 202 determines whether an interrupt request has occurred. In a case where it is determined that an interrupt request has occurred, the CPU 202 performs a process in S612. However, in a case where it is determined that no interrupt request has occurred, the CPU 202 performs a process in S618.

In S612, the CPU 202 determines whether the interrupt request detected in S611 is an interrupt request for a process to be performed in the normal power mode 302. In a case where it is determined that the interrupt request of interest is an interrupt request for a process to be performed in the normal power mode 302, the CPU 202 performs a process in S613. However, in a case where it is determined that the interrupt request of interest is not an interrupt request for a process to be performed in the normal power mode 302, the CPU 202 performs a process in S617.

In S613, the CPU 202 issues an interrupt request for notifying the CPU 210 that the power mode has been switched to the normal power mode 302. Receiving this interrupt request from the CPU 202 makes it impossible for the CPU 210 to go to the sleep state. In a case where the CPU 210 is already in the sleep state, the CPU 210 goes to the normal state in response to receiving this interrupt request from the CPU 202.

In S614, the CPU 202 issues a command to the DRAM control unit 206 to disable the DRAM control unit 206 to make the DRAM 208 go to the self-refresh state. Receiving this command from the CPU 202 makes it impossible for the DRAM control unit 206 to make the DRAM 208 go to the self-refresh state.

In S615, the CPU 202 instructs the USB control unit 209 to issue an ACK response.

In S616, the CPU 202 performs a process to make the MFP 100 go to the normal power mode 302. More specifically, for example, the CPU 202 controls the MFP 100 such that the CPU 214 and the display unit 215 go to the active operating state, and the frequency of the clock output by the clock generation unit 203 goes to the normal state. Thereafter, the CPU 202 performs a process in S603.

In S617, the CPU 202 executes a process according to the interrupt request that has occurred. In this process, the CPU 202 resets an elapsed time (T1) counted by a timer. Thereafter, the CPU 202 again performs the process in S611.

In S618, as in S606, the CPU 202 determines whether the transition condition 316 is satisfied. In a case where it is determined that the transition condition 316 is satisfied, the CPU 202 performs a process in S619. However, in a case where it is determined that the transition condition 316 is not satisfied, the CPU 202 again performs the process in S611.

In S619, the CPU 202 goes to the sleep state from the active operating state. In this process, if the CPU 210 is not in the sleep state, the MFP 100 goes to the power saving mode 306. However, if the CPU 210 is in the sleep state, the MFP 100 goes to the power saving mode 307.

In S620, as in S611, the CPU 202 determines whether an interrupt request has occurred. In a case where it is determined that an interrupt request has occurred, the CPU 202 performs a process in S621. However, in a case where it is determined that no interrupt request has occurred, the CPU 202 again performs the process in S620.

In S621, the CPU 202 goes to the active operating state from the sleep state. Returning to the active operating state makes it possible for the CPU 202 to determine the content of the interrupt request detected in the S620. In this situation, if the CPU 210 is not in the sleep state, the MFP 100 goes to the power saving mode 304. However if the CPU 210 is in the sleep state, the MFP 100 goes to the power saving mode 305.

In S622, the CPU 202 determines whether the detected interrupt request is an interrupt request for a process to be performed in the normal power mode 302. In a case where it is determined that the interrupt request of interest is an interrupt request for a process to be performed in the normal power mode 302, the CPU 202 performs a process in S613. However, in a case where it is determined that the interrupt request of interest is not an interrupt request for a process to be performed in the normal power mode 302, the CPU 202 performs a process in S617.

By controlling the process in the above-described manner, the CPU 202 is allowed to go to the sleep state at a proper time even in a situation in which network is set to be enabled, thereby reducing the consumption power. Furthermore, the MFP 100 is allowed to go to a proper power saving mode depending on processing states the respective CPUs even in the situation in which network is set to be enabled thereby reducing the consumption power.

Figure 7:
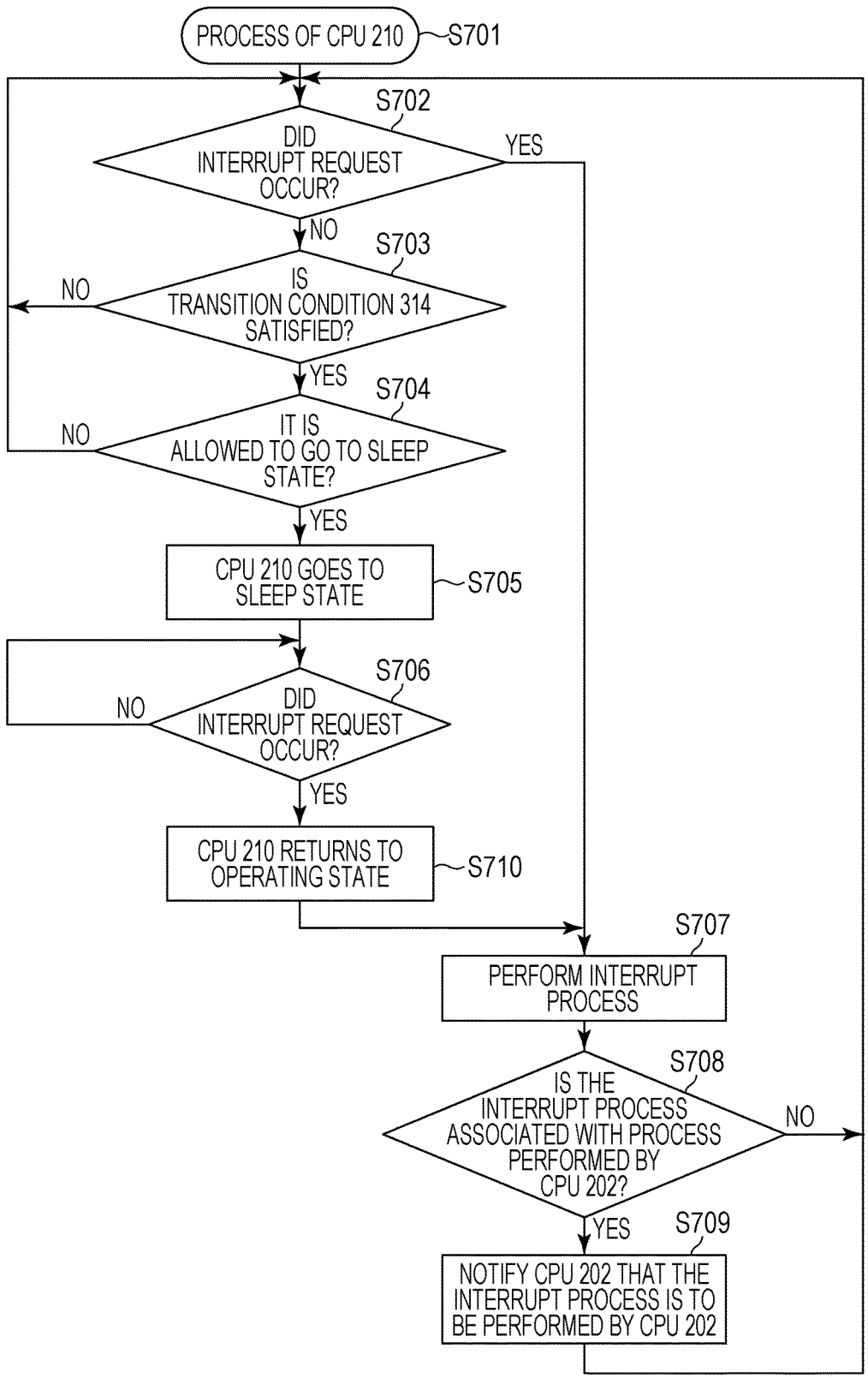
FIG. 7 is a flow chart illustrating a process performed by a sub CPU of a communication apparatus according to an embodiment.

FIG. 7 is a flow chart illustrating a process performed by the CPU 202 in the state in which network is set to be enabled. Note that the process shown in this flow chart is performed by the CPU 202 such that the CPU 202 loads a control program stored in the ROM 205 or a not-shown HDD into the SRAM 204 or the DRAM 208 and the CPU 210 executes this control program. Note that this process shown in the flow chart is started in a state (in S701) in which network connection is set to be enabled and the MFP 100 is in the normal power mode 302.

First, in S702, the CPU 210 determines whether an interrupt request to the CPU 210 has been issued. In a case where it is determined that an interrupt request has occurred, the CPU 210 performs a process in S707. However, in a case where it is determined that no interrupt request has occurred, the CPU 210 performs a process in S703.

In S707, the CPU 210 executes an interrupt process according to the interrupt request that has occurred issued to the CPU 210. In this process, the CPU 202 resets an elapsed time (T2) counted by a timer. Thereafter, the CPU 202 performs a process in S708.

In S708, the CPU 210 determines whether the interrupt request detected in S702 is an interrupt request for a process to be performed by the CPU 202. Examples of processes performed by the CPU 202 are a process on a received job, a process of transmitting information on the status of the MFP 100, etc. In a case where it is determined that the interrupt request of interest is an interrupt request for a process to be performed by the CPU 202, the CPU 210 performs a process in S709. On the other hand, in a case where it is determined that the interrupt request of interest is not an interrupt request for a process to be performed by the CPU 202, the CPU 210 again performs the process in S702.

In S709, the CPU 210 sends to the CPU 202 an interrupt request for notifying the CPU 202 of the occurrence of the interrupt request for the process to be performed by the CPU 202. Thereafter, the CPU 210 again performs the process in S702.

In S703, the CPU 210 determines whether the transition condition 314 is satisfied. In this process, the CPU 202 determines whether an elapsed time (T2) counted by a timer is larger than a set time defined in the transition condition 314. In a case where the timer counts down the elapsed time (T2), the CPU 202 may determine whether the elapsed time (T2) has reached 0. In a case where the timer counts the number of pulses generated by a TCU, the CPU 202 may determine whether the counted number of pulses has reached a value corresponding to the set time defined in the transition condition 314. In a case where it is determined that the transition condition 314 is satisfied, the CPU 210 performs a process in S704. However, in a case where it is determined that the transition condition 314 is not satisfied, the CPU 210 again performs the process in S702.

In S704, the CPU 210 determines whether it is allowed to go to the sleep state. When the CPU 210 receives from the CPU 202 the interrupt request notifying that the power mode has changed to the power saving mode 304, the CPU 210 is enabled to go to the sleep state. The determination as to whether it is allowed to go to the sleep state is performed, for example, using a flag or the like. Note that even in the case where the CPU 210 receives from the CPU 202 the interrupt request notifying that the power mode has been changed to the power saving mode 304, if the CPU 210 thereafter receives an interrupt request for notifying that the power mode has further switched to the normal power mode 302, the CPU 210 is disabled to go to the sleep state. In a case where it is determined that the transition to the sleep state is enabled, the CPU 210 performs a process in S705. However, in a case where it is determined that the transition to the sleep state is disabled, the CPU 210 again performs the process in S702.

In S705, the CPU 210 goes to the sleep state from the active operating state. In this situation, if the CPU 202 is not in the sleep state, the MFP 100 goes to the power saving mode 305. However, if the CPU 210 is in the sleep state, the MFP 100 goes to the power saving mode 307.

In S706, as in S702, the CPU 210 determines whether an interrupt request to the CPU 210 has been issued. In a case where it is determined that an interrupt request has occurred, the CPU 210 performs a process in S710. However, in a case where it is determined that no interrupt request has occurred, the CPU 210 again performs the process in S706.

In S710, the CPU 210 goes to the active operating state from the sleep state. In this process, if the CPU 202 is not in the sleep state, the MFP 100 goes to the power saving mode 304. However if the CPU 202 is in the sleep state, the MFP 100 goes to the power saving mode 306. Thereafter, the CPU 210 performs a process in S707 to execute an interrupt process according to the interrupt request.

By handling the process in the above-described manner, it becomes possible for the CPU 210 to go to the sleep state at a proper time even in a situation in which network connection is set to be enabled and there is a high probability that a network control is performed, and thus it becomes possible for the CPU 210 to reduce the consumption power. Thus it becomes possible for the MFP 100 to go to a proper power saving mode depending on processing states of the respective CPUs even in the situation in which network connection is set to be enabled and there is a high probability that a network control is performed, and thus it becomes possible for the MFP 100 to reduce the consumption power.

Figure 12:
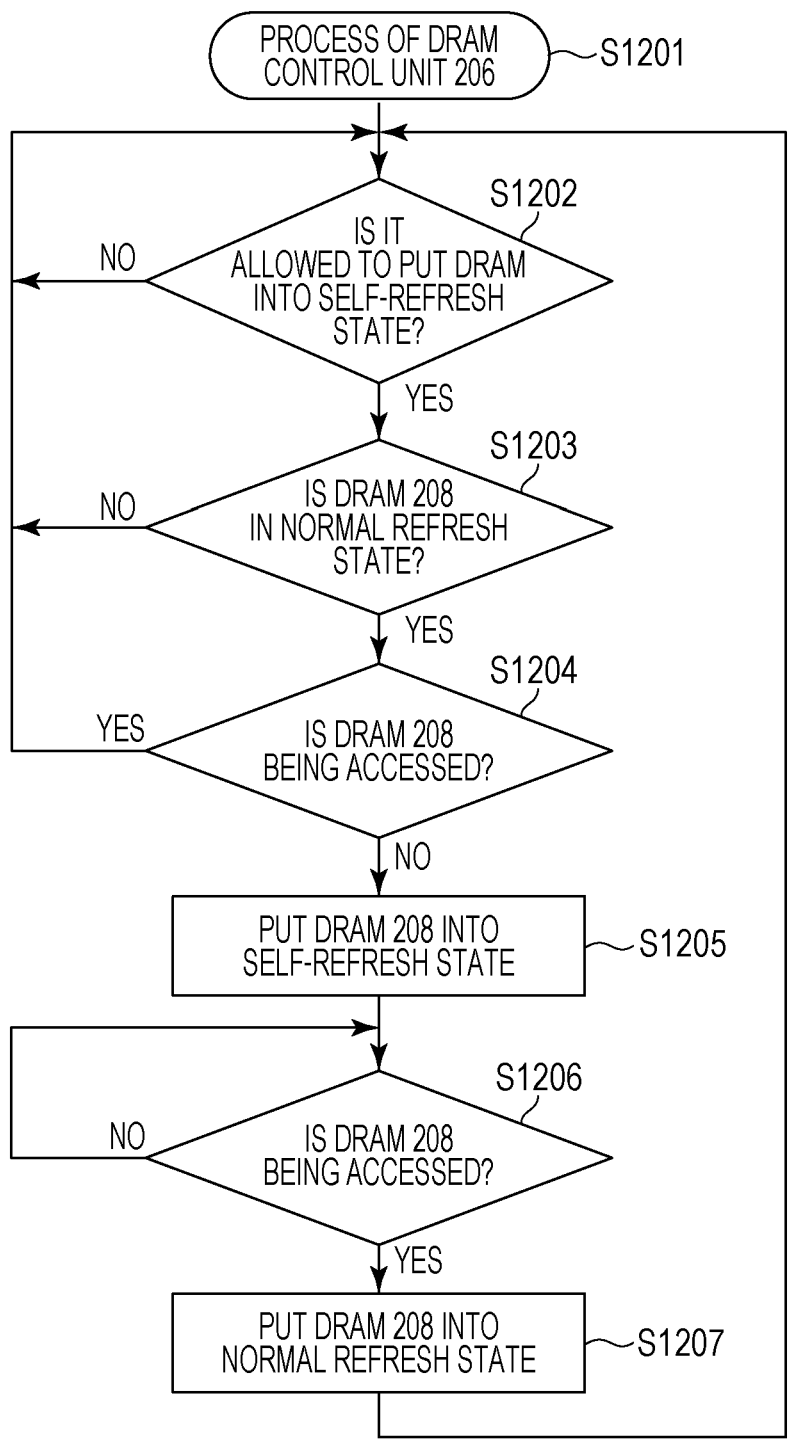
FIG. 12 is a flow chart illustrating a process performed by a DRAM control unit disposed in a communication apparatus to put a DRAM into a self-refresh state according to an embodiment.

FIG. 12 is a flow chart of a process performed by the DRAM control unit 206 to control the DRAM 208 to go to the self-refresh state. Note that the process shown in this flow chart is performed by the DRAM control unit 206 by wired logic without using a program.

First, in S1202, the DRAM control unit 206 determines whether it is allowed to make the DRAM 208 go to the self-refresh state. In a case where the DRAM control unit 206 receives from the CPU 202 a command that allows it control the DRAM 208 to go to the self-refresh state, the DRAM control unit 206 may make the DRAM 208 go to the self-refresh state. The determination as to whether it is allowed to make DRAM 208 go to the self-refresh state is performed, for example, using a flag or the like. In a case where the DRAM control unit 206 receives a command that disables the transition of the DRAM 208 to the self-refresh state, it becomes impossible for the DRAM control unit 206 to make the DRAM 208 go to the self-refresh state. In a case where it is determined that it is allowed to make transition of the DRAM 208 to the self-refresh state, the DRAM control unit 206 performs the process in S1203. On the other hand, in a case where it is determined that it is not allowed to make transition of the DRAM 208 to the self-refresh state, the DRAM control unit 206 again performs the process in S1202.

In S1203, the DRAM control unit 206 determines whether the DRAM 208 is in the normal refresh state. If the DRAM 208 is not in the normal refresh state, then the DRAM 208 is in the self-refresh state, and thus it is not necessary to perform the following process. Therefore, when it is determined that the DRAM 208 is in the normal refresh state, the DRAM control unit 206 performs the process in S1204. However, when it is determined that the DRAM 208 is not in the normal refresh state, the DRAM control unit 206 again performs the process in S1202.

In S1204, the DRAM control unit 206 determines whether the DRAM 208 is receiving accessing from any one of CPUs. The determination as to whether the DRAM 208 is receiving accessing from any one of CPUs is performed by determining whether there is a command waiting in a command queue in the DRAM control unit 206. When accessing to the DRAM 208 from any CPU occurs, a command associated with the accessing is put in the command queue in the DRAM control unit 206. Therefore, when all commands disappear from the command queue in the DRAM control unit 206, it is possible to determine that there is no longer accessing to the DRAM 208 from any CPU. In a case where it is determined no accessing to the DRAM 208 is occurring from any CPU, the DRAM control unit 206 performs the process in S1205. On the other hand, in a case where it is determined accessing to the DRAM 208 is occurring from some CPU, the DRAM control unit 206 performs the process in S1202.

In S1205, the DRAM control unit 206 controls the DRAM 208 to the DRAM 208 to go to the self-refresh state. For this purpose, the DRAM control unit 206 sends a command for controlling the DRAM 208 to go to the self-refresh state to the DRAM 208. Note that the DRAM control unit 206 may perform a process, before S1205, to determine whether a predetermined time period has elapsed from the point of time when the DRAM 208 starts getting no accessing by any CPU. In this case, when it is determined that the predetermined time period has elapsed, the DRAM control unit 206 performs the process in S1205, but when it is determined that the predetermined time period has not yet elapsed, the DRAM control unit 206 again performs the process in S1202.

In S1206, as in S1204, the DRAM control unit 206 determines whether the DRAM 208 receives no access from any CPU. In a case where it is determined that the DRAM 208 receives no access from any CPU, the DRAM control unit 206 again performs the process in S1206. However, in a case where it is determined that the DRAM 208 receives access from some CPU, the DRAM control unit 206 performs the process in S1207.

In S1207, the DRAM control unit 206 controls the DRAM 208 to go to the normal refresh state.

In the present embodiment, as described above, in the case where all CPUs using programs stored in the DRAM 208 are in the sleep state and no accessing to the DRAM 208 occurs, the DRAM 208 goes to the self-refresh state. By controlling the state transition in the above-described manner, it becomes possible for the MFP 100 to reduce the consumption power at a proper time without limiting the operation of each CPU.

Figure 10:
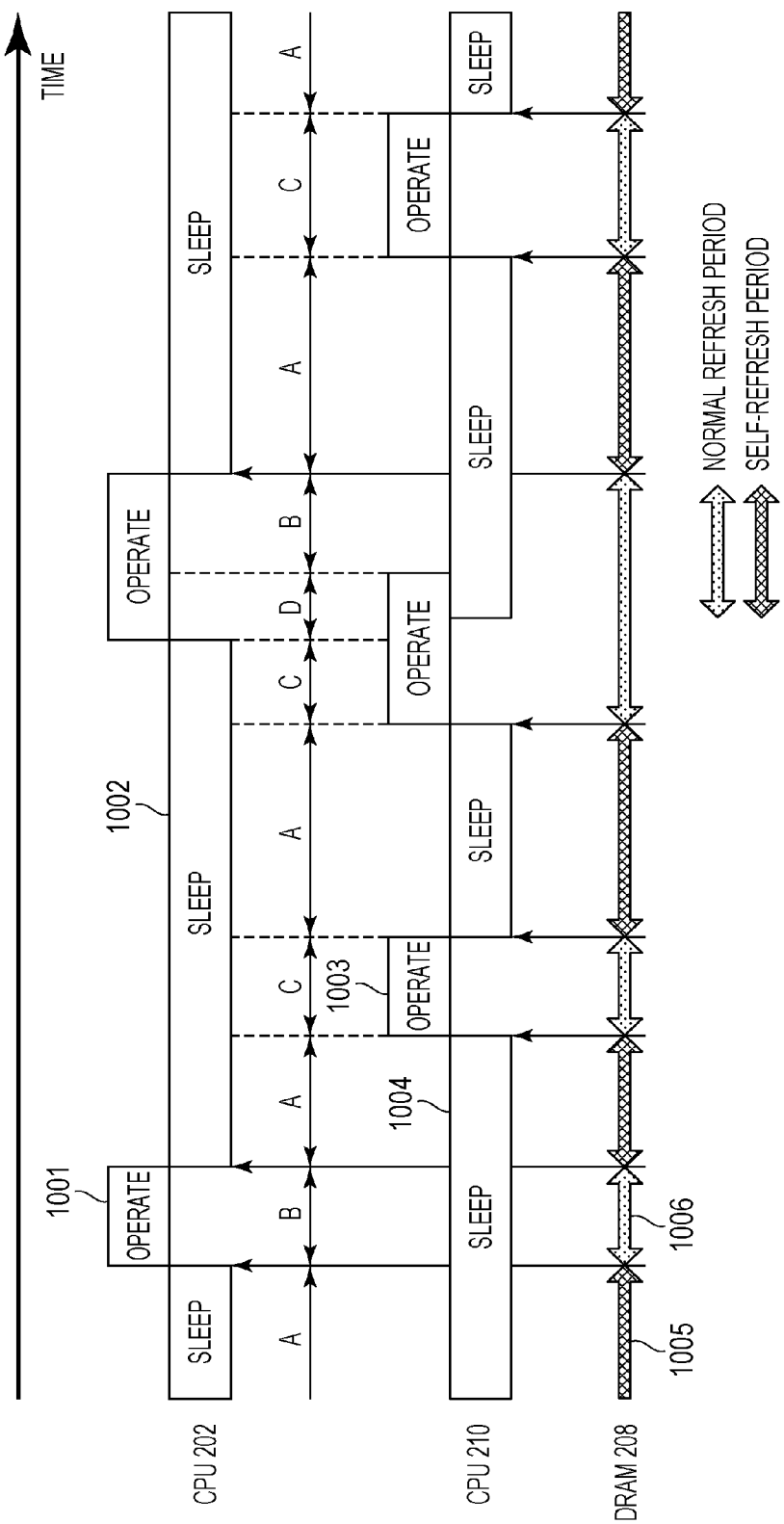
FIG. 10 is a diagram illustrating an example of a change with time in terms of an internal processing state of a communication apparatus according to an embodiment.

FIG. 10 is a diagram illustrating an example of a time-dependent change in internal processing state of the MFP 100. More specifically, FIG. 10 illustrates a time-depending change in status of the CPU 202, CPU 210, and DRAM 208, for a case in which network connection is set to be enabled and the MFP 100 is in the first power saving mode 303. In FIG. 10, because the MFP 100 is in the first power saving mode 303, the CPU 214 is assumed to be always in the sleep state.

A period 1001 denotes a period in which the CPU 202 is in operation, and a period 1002 denotes a period in which the CPU 202 is in the sleep state. A period 1003 denotes a period in which the CPU 210 is in operation, and a period 1004 denotes a period in which the CPU 210 is in the sleep state. A period 1005 denotes a period in which the DRAM 208 is in the self-refresh state, and a period 1006 denotes a period in which the DRAM 208 is in the normal refresh state. A period A denotes a period in which the CPU 202 and the CPU 210 are in the sleep state, and a period B denotes a period in which the CPU 202 is in operation but the CPU 210 is in the sleep state. A period C denotes a period in which the CPU 202 is in the sleep state but the CPU 210 is in operation, and a period D denotes a period in which the CPU 202 and the CPU 210 are in operation.

In a situation in which network connection is set to be enabled and the MFP 100 is connected to a network, the CPU 210 frequently accesses the DRAM 208 in order to process packets flowing on the network. In the present embodiment, in the of the above, the DRAM 208 does not go to the self-refresh state during a period in which some CPU is in operation (during the period B, during the period C and period D). On the other hand, even in a situation in which user of network is set to be enabled, there may be a period during which all CPUs are in the sleep state and the DRAM 208 is not accessed. In the present embodiment, therefore, even in the case where network connection is set to be enabled, the DRAM 208 goes to the self-refresh state during the period (the period A) in which all CPUs of the MFP 100 are in the sleep state. In the present embodiment, by handling the self-refresh state in the above-described manner, it becomes possible for the MFP 100 to reduce the consumption power of the DRAM 208 even in the case where the MFP 100 includes a plurality of CPUs and the program for controlling the network is stored in the DRAM 208. Note that there may be a situation in which each CPU includes a cache memory and each CPU is performing a process using a program stored in the cache memory of the CPU. In this situation, no CPUs access the DRAM 208 although the CPUs are not in the sleep state. Therefore, the DRAM 208 may go to the self-refresh state at a point of time when it turns out that the DRAM 208 no longer receives accessing regardless of whether each CPU is in the sleep state or not.

Other Embodiments

In the embodiments described above, the MFP 100 includes three CPUs. However, the number of CPUs in the MFP 100 is not limited to three. Regardless of the number of CPUs, the MFP 100 forces the DRAM 208 to go to the self-refresh state at least when the DRAM 208 does not receive accessing from any CPU using a program stored in the DRAM 208.

In the embodiments described above, the first power saving mode 303 has four sub power saving modes, and the second power saving mode 327 has two sub power saving modes. However, the number of sub power saving modes in each power saving mode is not limited to that described above. In the present disclosure, the first power saving mode 303 may have at least two or more sub power saving modes. More specifically, for example, in an alternative embodiment, the first power saving mode 303 may have an additional power saving mode between the power saving mode 304 and the power saving mode 306. Alternatively, the power saving mode 305 or 306 may be removed. In any case, the MFP 100 goes to the power saving mode 307 at least when the DRAM 208 does not receive accessing from any CPU using a program stored in the DRAM 208.

In the processes according to the respective embodiments described above with reference to flow charts, the order of steps may be changed, it does not necessarily need to perform all steps, and details of each step may be modified, as long as it is possible to achieve effects of the embodiments.

Each embodiment described above may also be realized by providing a program for realizing one or more functions of the embodiment to a system or an apparatus via a network or a recording medium, and executing the program by one or more processors in a computer disposed in the system or the apparatus. Each embodiment described above may also be realizing using a circuit (for example, an ASIC) realizing one or more functions of the embodiment.

The present disclosure makes it possible to properly control the state transition of the storage unit even in a situation in which network connection is set to be enabled or a connection to a network is established.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-110370, filed May 29, 2015, which is hereby incorporated by reference herein in its entirety.

What is claimed is:

1. A communication apparatus comprising:
a predetermined memory configured to operate in one of states including a normal refresh state in which a memory keeping process to keep information stored in the predetermined memory is executed in response to accepting an instruction from an outside, and a self-refresh state in which the memory keeping process is executed without accepting an instruction from the outside;
a power source configured to supply power; and
a plurality of processors including a first processor configured to perform a first process based on information received via a network and the information stored in the predetermined memory by accessing the predetermined memory, and a second processor configured to perform a second process, different from the first process performed by the first processor and based on the information stored in the predetermined memory, by accessing the predetermined memory,
wherein the first processor and the second processor are in one of a plurality of states including a first state of accepting power supply from the power source and accessing the predetermined memory to execute at least one process, a second state of accepting power supply from the power source but not accessing the predetermined memory and executing no process, and a third state of not accepting power supply from the power source,
wherein, in a case where the communication apparatus is connected to the network, the first processor is not in the third state but is in one of plural states including the first state and the second state and the second processor is not in the third state but is in one of the plural states including the first state and the second state and, in a case where the communication apparatus is not connected to the network, the first processor is in one of a plurality of states including the first state, the second state and the third state and the second processor is in one of the plurality of states including the first state, the second state and the third state,
wherein, in the case where the communication apparatus is connected to the network, the predetermined memory operates in the self-refresh state in a state that the first processor and the second processor are in the second state and, in the case where the communication apparatus is not connected to the network, the predetermined memory operates in the self-refresh state in a state that the first processor is in the third state and the second processor is in the second state, and
wherein consumption power consumed by the communication apparatus when the predetermined memory is operating in the normal refresh state is larger than consumption power consumed by the communication apparatus when the predetermined memory is operating in the self-refresh state.

2. The communication apparatus according to claim 1, wherein the first process performed by the first processor is at least one of a process on a packet flowing on the network and a process of receiving data via the network.

3. The communication apparatus according to claim 1, wherein the second process performed by the second processor is at least one of a process associated with a job, a process of setting the communication apparatus, and a process of displaying information on a display unit included in the communication apparatus.

4. The communication apparatus according to claim 1, wherein at least one of the plurality of processors is configured to control a printing unit configured to print an image on a recording medium of the communication apparatus by using a recording agent disposed in the communication apparatus.

5. The communication apparatus according to claim 1, further comprising a clock generation unit configured to supply a clock to the plurality of processors,
wherein, in the case where the communication apparatus is connected to the network, a clock having a first frequency is supplied to the first processor and the second processor in a state that the first processor and the second processor are in the second state and, in the case where the communication apparatus is not connected to the network, a clock having a second frequency, lower than the first frequency, is supplied to the first processor and the second processor in a state that the first processor is in the third state and the second processor is in the second state.

6. The communication apparatus according to claim 1, wherein the plurality of processors includes a third processor in one of the plurality of states and configured to execute a process to control a screen to be displayed on a display unit included in the communication apparatus by accessing the predetermined memory, and
wherein, in the case where the communication apparatus is connected to the network, the predetermined memory operates in the self-refresh state in a state that the first processor, the second processor, and the third processor are in the second state and, in the case where the communication apparatus is not connected to the network, the predetermined memory operates in the self-refresh state in a state that the first processor is in the third state and the second processor and the third processor are in the second state.

7. The communication apparatus according to claim 1, further comprising a PHY configured to control a physical layer of the predetermined memory and accept power supply from the power source,
wherein the PHY operates in one of an ON state in which the PHY accepts power supply from the power source and an OFF state in which the PHY does not accept power supply from the power source,
wherein the PHY does not operate in the OFF state but does operates in the ON state in the case where the communication apparatus is connected to the network, and the PHY operates in one of the OFF state and the ON state in the case where the communication apparatus is not connected to the network, and
wherein, in the case where the communication apparatus is connected to the network, control is performed so that the PHY operates in the ON state in a state that the first processor and the second processor are in the second state and, in the case where the communication apparatus is not connected to the network, control is performed so that the PHY operates in the OFF state in a state that the first processor is in the third state, the second processor is in the second state.

8. The communication apparatus according to claim 1, wherein the communication apparatus operates in one of an enabled state in which connection with the network is enabled and a disabled state in which connection with the network is disabled, and
wherein the first processor transitions from the first state to the second state based on not accepting a request for executing a process and the communication apparatus being operating in the enabled state, and the first processor transitions from the first state to the third state based on not accepting a request for executing a process and the communication apparatus being operating in the disabled state.

9. The communication apparatus according to claim 1, wherein the predetermined memory is a Dynamic Random Access Memory.

10. A control method of controlling a communication apparatus, wherein the communication apparatus includes:
a predetermined memory configured to operate in one of states including a normal refresh state in which a memory keeping process to keep information stored in the predetermined memory is executed in response to accepting an instruction from an outside, and a self-refresh state in which the memory keeping process is executed without accepting an instruction from the outside,
a power source configured to supply power, and
a plurality of processors including
a first processor configured to perform a first process based on information received via a network and the information stored in the predetermined memory by accessing the predetermined memory, and
a second processor configured to perform a second process, different from the first process performed by the first processor and based on the information stored in the predetermined memory, by accessing the predetermined memory,
wherein the first processor and the second processor are in one of a plurality of states including a first state of accepting power supply from the power source and accessing the predetermined memory to execute at least one process, a second state of accepting power supply from the power source but not accessing the predetermined memory and executing no process, and a third state of not accepting power supply from the power source,
the control method comprising:
causing, in a case where the communication apparatus is connected to the network, the first processor not to be in the third state but in one of plural states including the first state and the second state and the second processor not to be in the third state but is in one of the plural states including the first state and the second state and causing, in a case where the communication apparatus is not connected to the network, the first processor to be in one of a plurality of states including the first state, the second state and the third state and the second processor to be in one of the plurality of states :including the first state, the second state and the third state; and
causing, in the case where the communication apparatus is connected to the network, the predetermined memory to operate in the self-refresh state in a state that the first processor and the second processor are in the second state and causing, in the case where the communication apparatus is not connected to the network, the predetermined memory to operate in the self-refresh state in a state that the first processor is in the third state and the second processor is in the second state,
wherein consumption power consumed by the communication apparatus when the predetermined memory is operating in the normal refresh state is larger than consumption power consumed by the communication apparatus when the predetermined memory is operating in the self-refresh state.

11. The control method according to claim 10, wherein the first process performed by the first processor is at least one of a process on a packet flowing on the network and a process of receiving data via the network.

12. The control method according to claim 10, wherein the second process performed by the second processor is at least one a process associated with a job, a process of setting the communication apparatus, and a process of displaying information on a display unit included in the communication apparatus.

13. The control method according to claim 10, the control method further comprising controlling, via at least one of the plurality of processors, a printing unit to print an image on a recording medium of the communication apparatus by using a recording agent disposed in the communication apparatus.

14. The control method according to claim 10, wherein the communication apparatus further includes a clock generation unit configured to supply a clock to the plurality of processors, the control method further comprising:
supplying, in the case where the communication apparatus is connected to the network, a clock having a first frequency to the first processor and the second processor in a state that the first processor and the second processor are in the second state and supplying, in the case where the communication apparatus is not connected to the network, a clock having a second frequency, lower than the first frequency, to the first processor and the second processor in a state that the first, processor is in the third state and the second processor is in the second state.

15. The control method according to claim 10, wherein the plurality of processors includes a third processor in one of the plurality of states and configured to execute a process to control a screen to be displayed on a display unit included in the communication apparatus by accessing the predetermined memory, the control method further comprising:
operating, in the case where the communication apparatus is connected to the network, the predetermined memory in the self-refresh state in a state that the first processor, the second processor, and the third processor are in the second state and operating, in the case where the communication apparatus is not connected to the network, the predetermined memory in the self-refresh state in a state that the first processor is in the third state and the second processor and the third processor are in the second state.

16. The control method according to claim 10,
wherein the communication apparatus further includes a PHY configured to control a physical layer of the predetermined memory and accept power supply from the power source,
wherein the PHY operates in one of an ON state in which the PHY accepts power supply from the power source and an OFF state in which the PHY does not accept power supply from the power source,
wherein the PHY does not operate in the OFF state but does operates in the ON state in the case where the communication apparatus is connected to the network, and the PHY operates in one of the OFF state and the ON state in the case where the communication apparatus is not connected to the network,
the control method further comprising:
performing, in the case where the communication apparatus is connected to the network, control so that the PHY operates in the ON state in a state that the first processor and the second processor are in the second state and performing, in the case where the communication apparatus is not connected to the network, control so that the PHY operates in the OFF state in a state that the first processor is in the third state, the second processor is in the second state.

17. The control method according to claim 10, wherein the communication apparatus operates in one of an enabled state in which connection with the network is enabled and a disabled state in which connection with the network is disabled, the control method further comprising:

transitioning the first processor from the first state to the second state based on not accepting a request for executing a process and the communication apparatus being operating in the enabled state, and transitioning the first processor from the first state to the third state based on not accepting a request for executing a process and the communication apparatus being operating in the disabled state.

18. The control method according to claim 10, wherein the predetermined memory is a Dynamic Random Access Memory.

19. A non-transitory computer readable medium storing a program to cause a computer to perform a control method of controlling a communication apparatus, wherein the communication apparatus includes:

a predetermined memory configured to operate in one of states including a normal refresh state in which a memory keeping process to keep information stored in the predetermined memory is executed in response to accepting an instruction from an outside, and a self-refresh state in which the memory keeping process is executed without accepting an instruction from the outside, a power source configured to supply power, and a plurality of processors including a first processor configured to perform a first process based on information received via a network and the information stored in the predetermined memory by accessing the predetermined memory, and a second processor configured to perform a second process, different from the first process performed by the first processor and based on the information stored in the predetermined memory, by accessing the predetermined memory, wherein the first processor and the second processor are in one of a plurality of states including a first state of accepting power supply from the power source and accessing the predetermined memory to execute at least one process, a second state of accepting power supply from the power source but not accessing the predetermined memory and executing no process, and a third state of not accepting power supply from the power source, the control method comprising:

causing, in a case where the communication apparatus is connected to the network, the first processor not to be in the third state but in one of plural states including the first state and the second state and the second processor not to be in the third state but is in one of the plural states including the first state and the second state and causing, in a case where the communication apparatus is not connected to the network, the first processor to be in one of a plurality of states including the first state, the second state and the third state and the second processor to be in one of the plurality of states including the first state, the second state and the third state; and causing, in the case where the communication apparatus is connected to the network, the predetermined memory to operate in the self-refresh state in a state that the first processor and the second processor are in the second state and causing, in the case where the communication apparatus is not connected to the network, the predetermined memory to operate in the self-refresh state in a state that the first processor is in the third state and the second processor is in the second state, wherein consumption power consumed by the communication apparatus when the predetermined memory is operating in the normal refresh state is larger than consumption power consumed by the communication apparatus whim the predetermined memory is operating in the self-refresh state.

* * * * *